United States Patent
Huang et al.

(10) Patent No.: US 12,362,356 B2
(45) Date of Patent: Jul. 15, 2025

(54) CLASS OF POROUS METAL OXIDE-BASED ELECTROCHEMICAL ENERGY STORAGE MATERIALS AND PREPARATION METHOD AND APPLICATION THEREOF

(71) Applicants: SHANGHAI INSTITUTE OF CERAMICS, CHINESE ACADEMY OF SCIENCES, Shanghai (CN); BEIJING UNIVERSITY, Beijing (CN)

(72) Inventors: Fuqiang Huang, Shanghai (CN); Wujie Dong, Shanghai (CN); Zichao Liu, Shanghai (CN); Xiangli Che, Shanghai (CN)

(73) Assignees: SHANGHAI INSTITUTE OF CERAMICS, CHINESE ACADEMY OF SCIENCES, Shanghai (CN); BEIJING UNIVERSITY, Beijing (CN)

( * ) Notice: Subject to any disclaimer, the term of this patent is extended or adjusted under 35 U.S.C. 154(b) by 852 days.

(21) Appl. No.: 17/596,763

(22) PCT Filed: Jun. 19, 2020

(86) PCT No.: PCT/CN2020/097181
§ 371 (c)(1),
(2) Date: Dec. 17, 2021

(87) PCT Pub. No.: WO2020/253843
PCT Pub. Date: Dec. 24, 2020

(65) Prior Publication Data
US 2022/0238875 A1    Jul. 28, 2022

(30) Foreign Application Priority Data
Jun. 21, 2019 (CN) .......................... 201910541802.6
Jan. 9, 2020 (CN) .......................... 202010023063.4

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/1391* (2013.01); *H01M 10/0525* (2013.01); *H01M 2004/021* (2013.01)

(58) Field of Classification Search
CPC ............ H01M 10/0525; C01P 2002/32; C01P 2002/34; C01P 2002/52; C01G 23/047;
(Continued)

(56) References Cited

U.S. PATENT DOCUMENTS 8,574,340 B2    11/2013  Bakker et al.
2012/0207994 A1   8/2012  Wang et al.

FOREIGN PATENT DOCUMENTS

CN    103111301 A    5/2013
CN    103219527 A    7/2013
(Continued)

OTHER PUBLICATIONS

He, Y. et al., "Ultrathin $Li_4Ti_5O_{12}$ Nanosheet Based Hierarchical Microspheres for High-Rate and Long-Cycle Life Li-Ion Batteries," Advanced Energy Materials, 2017, vol. 7, No. 1700950, Jul. 19, 2017, 6 pages.

Reddy, M. et al., "Metal Oxides and Oxysalts as Anode Materials for Li Ion Batteries," Chemical reviews, 2013, vol. 113, No. 7, Apr. 2, 2013, 94 pages.

Sun, H. et al., "Three-dimensional holey-graphene/niobia composite architectures for ultrahigh-rate energy storage," Science, vol. 356, No. 6338, May 12, 2017, 7 pages.

*Primary Examiner* — Matthew W Van Oudenaren
(74) *Attorney, Agent, or Firm* — Alleman Hall & Tuttle LLP

(57) ABSTRACT

The invention relates to a class of electrochemical energy storage materials and a preparation method and application thereof. A porous metal oxide-based electrochemical energy storage material at least comprises a host metal oxide with a hierarchical pore structure; wherein, the host metal oxide
(Continued)

is a single crystal, quasicrystal, or twin crystal structure with ordered atomic lattice arrangement, the crystal is rich in oxygen atom vacancy defects, the structural general formula is $M_xO_{y-z}$, wherein M is selected from one or more combinations of niobium element, molybdenum element, titanium element, vanadium element, manganese element, iron element, cobalt element, nickel element, copper element, zinc element, tungsten element, tantalum element, and zirconium element; and $1 \leq x \leq 2$, $1 \leq y \leq 5$, and $0.1 \leq z \leq 0.9$, preferably $Nb_2O_{5-z}$.

2 Claims, 10 Drawing Sheets

(51) Int. Cl.
 *H01M 4/1391* (2010.01)
 *H01M 10/0525* (2010.01)

(58) Field of Classification Search
 CPC .... C01G 39/02; C01G 49/0018; C01G 49/06; C01G 33/00
 See application file for complete search history.

(56) References Cited

FOREIGN PATENT DOCUMENTS

| CN | 103579581 A | 2/2014 |
|---|---|---|
| CN | 103855394 A | 6/2014 |
| CN | 109319832 * | 2/2019 |

* cited by examiner

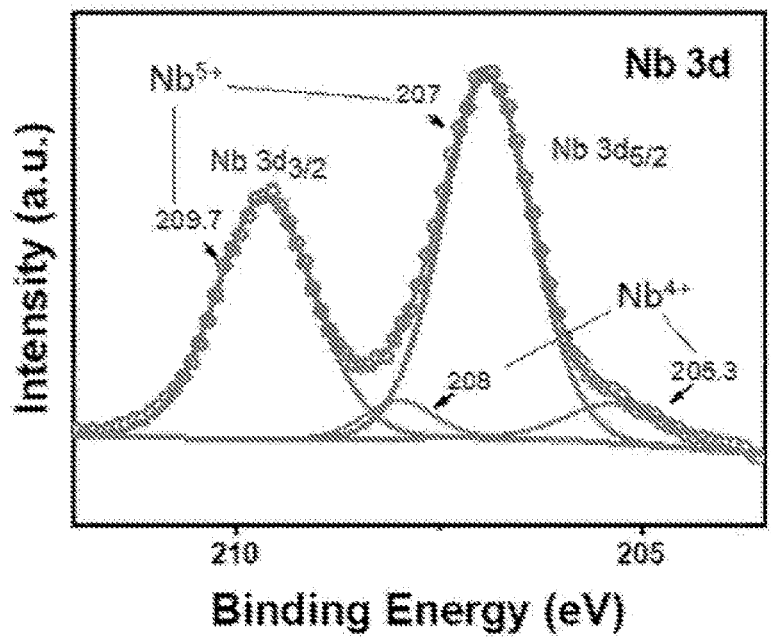
FIG. 5B
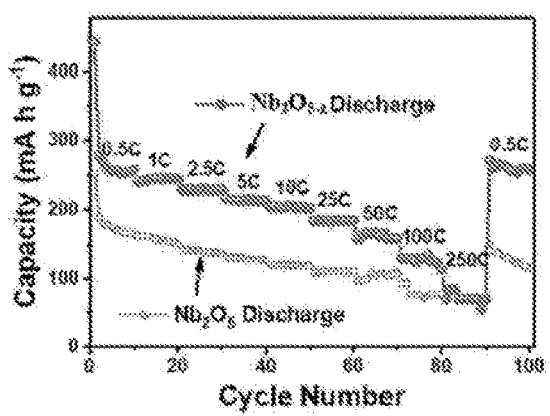
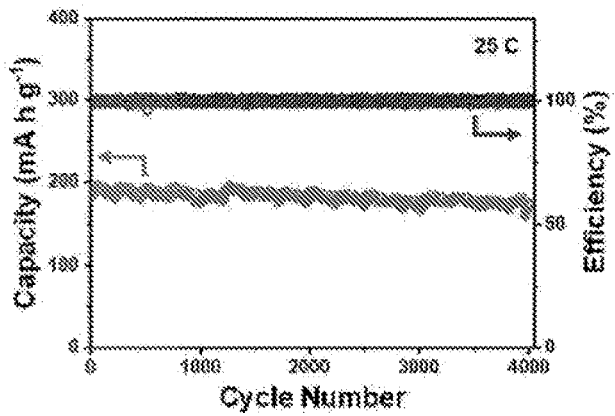
FIG. 6A						FIG. 6B

CLASS OF POROUS METAL OXIDE-BASED ELECTROCHEMICAL ENERGY STORAGE MATERIALS AND PREPARATION METHOD AND APPLICATION THEREOF

TECHNICAL FIELD

The invention relates to a class of electrochemical energy storage materials and a preparation method thereof, in particular to a class of porous metal oxide-based electrochemical energy storage materials with a multi-stage micro mesoporous structure and a corresponding bottom-up microetching preparation method and application in lithium-ion battery electrode materials. The porous metal oxide-based electrochemical energy storage material is a new type of material structure with a novel controllable multi-stage micro-mesoporous structure and a defect-rich single crystal with high electrochemical activity, has high electronic conductivity and fast lithium ion transport characteristics, can realize capacitive extremely fast storage and discharge dangling bonds and abundant surface defects in the multistage mesoporous structure, breaks through the theoretical energy storage limit of this type of material, is an important new type of lithium-ion battery electrode material, and belongs to the field of materials.

BACKGROUND

The energy crisis has swept the world, and the pollution and non-renewability of traditional fossil energy are widely recognized and valued by the world. In this context, the electrochemical energy storage technology has received extensive attention from industry and academia, and has achieved rapid development. Lithium-ion batteries and supercapacitors are the latest technologies in the field of electrochemical energy storage. In 1989, the company SONY in Japan firstly proposed that $LiCoO_2$ be used as a Li source anode, petroleum coke be used as a cathode, $LiPF_6$ be dissolved in propylene carbonate, and ethylene carbonate be used as an electrolyte, so that a new type of lithium-ion battery was developed and commercialized in 1991. Compared with the traditional secondary battery, the lithium-ion battery has the advantages of a high open circuit voltage, high energy density, a long service life and the like, and can be applied to the fields of portable electronic equipment such as mobile phones, cameras, notebook computers and the like, military equipment, medical equipment, and the like. At present, lithium-ion batteries are developing into new fields such as electric vehicles and large-scale energy storage, but the stability, safety, energy density, and power density of the lithium-ion batteries cannot meet the requirements of practical application, so that new high-performance energy storage materials need to be developed, and the application market of the lithium-ion batteries is further expanded.

As a key component of lithium-ion batteries, negative electrode materials have attracted widespread attention. Currently, the negative electrode materials of commercial lithium-ion batteries mainly include artificial graphite (natural modified graphite, mesophase carbon microspheres), silicon-carbon composite materials, and lithium titanate with more stable performance. Among them, the graphite material and the silicon-carbon composite negative electrode material with hexagonal layered structure are close to the maximum theoretical capacity of the material under low battery usage rate, and the cycle life can reach more than 500 times, and thus the battery requirements of portable electronic devices can be basically met. In new fields such as automobiles, graphite or silicon-carbon anodes will reduce the Coulomb efficiency due to the inability to form a stable solid electrolyte interface (SEI) on the surface of the anode. The battery is completely inactivated due to the pulverization and shedding of electrode materials after long-time circulation under a high-rate working condition, and the capacity of the battery is attenuated due to the problems of the poor conductivity, volume effect and the like. Lithium titanate has the advantages of a "zero strain" release lithium structure, long cycle life, and higher safety. The three-dimensional pore channel structure of the lithium titanate crystal provides a channel for lithium-ion diffusion while maintaining the stability of the structure during the lithium intercalation and deintercalation process. The formation of the SEI film is inhibited by the working potential near 1.55V, and the volume change of lithium titanate before and after lithium intercalation of the lithium titanate is rarely less than 1%, so that the advantages of long service life and high stability can be realized (Ultrathin $Li_4Ti_5O_{12}$ Nanosheet Based Hierarchical Microspheres for HighRate and Long-Cycle Life Lit Ion Batteries, Advanced Energy Materials, 2017, 7 (21): 1700950.). However, because only about 60% of titanium (IV) can be reducible, the lower theoretical capacity (175 mA h $g^{-1}$) limits the application of lithium titanate batteries. Therefore, it is urgent to develop a new type of electrode material that has both high-rate charge and discharge stability and large capacity.

As the negative electrode material, metal oxides such as $TiO_2$, $Nb_2O_5$, $V_2O_5$, $MoO_2$, $WO_2$, $Fe_2O_3$, FeO, $Co_3O_4$, CuO, ZnO, and the like (Metal oxides and oxysalts as anode materials for Li ion batteries. *Chemical reviews*, 2013, 113(7): 5364-5457) can be classified into three categories according to the reaction mechanism of lithium storage: one is the intercalation mechanism; the oxide with this kind of mechanism can maintain a relatively stable crystal structure without being damaged and generate limited volume change in the process of lithium intercalation and lithium deintercalation, such as $TiO_2$, $Nb_2O_5$, $V_2O_5$, $MoO_2$, $WO_2$, $Li_4Ti_5O_{12}$, and other front transition metal oxides, and have the advantages of high multiplying power and high stability, but the energy storage capacity of the oxide is relatively low. The other two mechanisms include the conversion type mechanism and the alloy type mechanism. The former stores energy by forming lithium oxide and transition metal elements, and the latter stores energy by forming an alloy of a transition metal and lithium, and has the advantage of large lithium storage capacity, but the stability and rate capability of the electrode are poor due to a very large volume change.

In general, transition metal oxides can only achieve a higher lithium storage capacity with a large number of additives and sophisticated structural design, such as the use of graphene, carbon fiber composite niobium oxide, or special nanostructures such as nanosheets, nanowires, and multilevel structures. For example, tremella-shaped $MoO_2$ nanosheets are used as negative electrodes, their large surface area reduces the actual effective current density and makes the structure change more smoothly, the ion diffusion speed of the flake $MoO_2$ is accelerated, and achieve a more uniform evolution of the structure, a stable capacity of 600 mA h $g^{-1}$ is obtained. For example, the porous graphene-composite $Nb_2O_5$ prepared by Sun et al can still work normally and maintain a capacity of 90 mA h $g^{-1}$ at a working rate of 100 C (charging/discharging time is less than 36 seconds) (Three-dimensional holey-graphene/niobia composite architectures for ultrahigh-rate energy storage. Science, 2017, 356(6338): 599-604). The above methods have been extensively proven to improve the performance of electrode materials, but this optimization method is relatively difficult to control, consumes time and labor under industrial-grade preparation conditions, has a high cost, and greatly limits its potential for realizing industrial applications.

Therefore, metal oxides have the potential to produce high-performance electrodes, but there are still the following problems: (1) the reversible specific capacity of charge and discharge of the material is small; (2) the solid electrolyte interface (SEI) is unstable during the charge-discharge cycles, so that the lithium source is consumed and the battery collapses; (3) the performance of the material is unstable during the charging and discharging processes; (4) the electronic conductivity and the ionic conductivity of the material cannot achieve high-rate working performance; (5) the preparation process is complicated, the cost is high, and pollution is caused.

TECHNICAL PROBLEM

Based on the problems of the metal oxides as the energy storage materials (for example, the current situation is that the current commercial battery is insufficient under the high-rate operating condition), the present invention aims to provide a high-capacity, high-rate, high stability, porous metal oxide-based electrochemical energy storage material with a defect-rich single crystal structure and controllable micro-mesoporous microstructure, and porous polymetals with defect-rich single crystal structure and controllable micro-mesoporous microstructure composite oxide material and its preparation method and application thereof.

SUMMARY

In one aspect, the present invention provides a class of porous metal oxide-based electrochemical energy storage materials, the porous metal oxide-based electrochemical energy storage material is a new type of material structure, and at least comprises a host metal oxide with a controllable micro mesoporous structure (hierarchical pore structure), wherein the host metal oxide is a single crystal, quasicrystal, or twin crystal structure with an ordered atomic crystal lattice, and the crystal contains oxygen vacancy defects. The structural general formula is $M_xO_{y-z}$, wherein M is selected from at least one of niobium element, molybdenum element, titanium element, vanadium element, manganese element, iron element, cobalt element, nickel element, copper element, zinc element, tungsten element, tantalum element, and zirconium element; and $1 \leq x \leq 2$, $1 \leq y \leq 5$, $0.1 \leq z \leq 0.9$, and $Nb_2O_{5-z}$ is preferably selected. More preferably, metal elements whose metal oxides have mixed valence states are preferred. For example, $Nb^{5+}$ or $Nb^{4+}$ is preferred (as shown in FIG. 5B).

In the present disclosure, the porous metal oxide-based electrochemical energy storage material is a new type of material structure, has a novel controllable multistage micro mesoporous structure and a defect-rich single crystal structure with high electrochemical activity, has high electronic conductivity and fast lithium ion transport characteristics, can achieve capacitance type extremely-rapid storage and discharge through dangling bonds and abundant surface defects in its hierarchical pore structure, breaks through the theoretical energy storage limit of this type of material, and is an important new type of lithium ion battery electrode material.

In the present disclosure, the obtained porous metal oxide-based electrochemical energy storage material contains a hierarchical pore structure (that is, a micro-mesoporous structure), and the size of the disordered pores is mainly distributed below 20 nanometers and concentrated below 5 nanometers, and the particles have a number of a specific surface area of ten to hundreds of square meters per gram; based on a porous single crystal structure, the metal oxide-based material constructs an atomic-scale open structure, an atomic-scale defect structure, and a micro mesoporous low-dimensional confinement structure to coordinate and optimize energy storage. Specifically, the hierarchical pore structure in $M_xO_{y-z}$ is composed of micropores with a pore diameter of less than 2 nm, mesopores with a pore diameter distribution of 2 to 50 nm, and disordered defects. Preferably, the pore diameter of the micropore is 1 nm or more and less than 2 nm, the pore diameter of the mesopore is 3 to 40 nm, and the size of the disordered defect is less than 1 nm. Among them, the micropores and some of the mesopores with a smaller size (1 to 10 nm) are distributed inside the crystal particles, and the mesopores with a larger size (10 to 50 nm) are distributed between the crystal particles, and the size and distribution of all pores can be regulated during preparation.

The present invention discloses a method for preparing the metal oxide-based electrochemical energy storage material from top to bottom by taking the mechanism of Caster landform formation as reference, and develops a method for micro-etching alkali (earth) metals and transition metal composite oxides by micro-acid micro-pressure micro-etching. The method comprises the steps of using a multi-element metal composite oxide $B_aM_bO_c$ as a precursor, using an acid solution as an etching agent, adopting a multi-step method to selectively etch and dissolve all B-site ions and part of M-site ions in the precursor, carrying out structural rearrangement of unit cell layers on a non-dissolved part, and utilizing a large amount of stress accumulation caused by unit cell change to prepare the metal oxide, $M_xO_{y-z}$, which is rich in high-reactivity defects and pores in the crystal, the chemical composition, specific morphology and crystal structure of the product depend on the structure of the precursor, the type of B-site elements and the specific reaction conditions. Including the following steps:

(1) Preparing the precursor of multi-element metal composite oxide ($B_aM_bO_c$, B is one or more of alkali metal, alkaline earth metal or lanthanum, aluminum and the like, M is a combination of one or more of niobium, titanium, vanadium, manganese, iron, cobalt, nickel, copper and zinc and the like) by high temperature solid phase method, sol-gel method, hydrothermal synthesis method, or co-precipitation method;

(2) Mixing the multi-element metal composite oxide $B_aM_bO_c$ obtained in step (1) with an acidic solution, (the acidic solution is one or more of hydrochloric acid, nitric acid, acetic acid, formic acid, ethylene diamine tetraacetic acid, ferric chloride, copper chloride and the like, and the solvent is one or more of water, methanol, ethanol, ethylene glycol, propanol, acetone and the like), and performing etching reaction by adopting an acidic solute with the molar ratio of 1 to 50 times in a multi-step method: firstly, placing the mixed system in a normal pressure environment at 50 to 90° C., maintaining of the heating for 1 hour to 7 days, etching ions on the surface layer and superficial layer of the multi-metal composite oxide, slowly dissolving out ions near the surface layer, and simultaneously maintaining the stability of the structure and morphology. Secondly, the mixed system is transferred to a high temperature and high-pressure reaction vessel, the temperature is increased to 110 to 140° C., and the temperature is kept for 1 hour to 7 days to promote the dynamics of the etching reaction. Finally, the reaction temperature of the mixed system is raised to 150 to 220° C., and the temperature is kept for 1 hour to 7 days, so that the reaction kinetics are further improved, and at the same time, the ordering of the crystal structure is promoted at high temperature;

(3) placing the solid particles obtained in step (2) in an inert atmosphere furnace or a vacuum tube furnace for heating and annealing, wherein the annealing temperature is 400 to 1,000° C., and the annealing time is 1 to 24 hours. That is, the metal oxide $M_xO_{y-z}$ with mixed valence metal atoms is obtained in mixed valence states. The meaning of the chemical energy storage performance of metal oxide $M_xO_{y-z}$ is as follows: the material has the characteristics of excellent high rate, high stability, and the like when being used as an electrode material for energy storage devices such as secondary batteries, super capacitors, and the like.

In another aspect, the present invention preferably provides a porous monocrystalline metal oxide-based electrochemical energy storage material with a defect-rich monocrystalline structure and controllable micro-mesopores, which has a general structural formula of $A_eO_f@M_xO_{y-z}$ and can be called "multi-metal composite oxide materials" due to the fact that the material contains a variety of metal oxides. The $M_xO_{y-z}$ is an ordered single crystal, quasi-single crystal, or twin crystal structure, with a defect-rich single crystal structure and a controllable micro-mesoporous structure, and a heterogeneous metal oxide $A_eO_f$ limited domain is deposited in the multi-level pore structure of $M_xO_{y-z}$ and on the surface to form a composite structure; $1 \le x \le 2$, $1 \le y \le 5$, $0.1 \le z \le 0.9$, $1 \le e \le 3$, and $1 \le f \le 4$.

Wherein, A is selected from at least one of iron element, nickel element, cobalt element, manganese element, chromium element, zinc element, and tin element; M is selected from at least one of niobium, molybdenum, titanium, vanadium, and manganese at least one of element, iron element, cobalt element, nickel element, copper element, zinc element, tungsten element, tantalum element, and zirconium element; preferably, M is titanium element or/and niobium element, and A is iron element.

In the present invention, the multi-metal composite oxide material has an ordered crystal structure, which is beneficial to improving the stability of the electrochemical process of the material, and reducing a large amount of grain boundary resistance possibly brought by polycrystal. In addition, the disordered defects and micropores in the crystal of the multi-metal composite oxide materials provide a large number of dangling bonds with high reaction activity, the energy storage capacity of the material is improved, and micropores with the pore diameter less than 2 nanometers and mesopores with the pore diameter more than or equal to 2 nanometers and less than or equal to 50 nm provide a buffer for volume change in the electrochemical process of the material, improve the stability of the material, provide channels for electrolyte diffusion, and improve the high-rate working performance of the material; further limiting the domain growth of conversion type or alloy type lithium storage metal element oxide ($A_eO_f$) has extremely high reaction activity due to the size effect, and its poor conductivity and the volume change caused by lithium intercalation and lithium removal is greatly relieved due to the surrounding wrapping intercalation type metal oxide; the existence of the mixed valence metal elements (M element with two or more valence states exists in $M_xO_{y-z}$, preferably $Ti^{3+}/Ti^{4+}$ and $Nb^{5+}/Nb^{4+}$) improves the conductivity of the material, so that the electrochemical reaction can be performed more uniformly and smoothly.

Preferably, the porous structure of the $M_xO_{y-z}$ comprises mesopores with a pore diameter of more than or equal to 2 nm and less than or equal to 50 nm, and micropores with a pore diameter of less than 2 nm; preferably, the pore diameter of the mesopores is 30 to 40 nm, and the pore size of the micropores is greater than or equal to 1 nm and less than 2 nm.

Preferably, the atomic proportion of A is 0.1 to 20 at %, and the atomic proportion is calculated by A/(A+M).

Preferably, the size of the multi-metal composite oxide material is 10 nm to 50 μm, preferably, the size is 50 nm.

Preferably, the porous metal oxide-based electrochemical energy storage material has high conductivity. Preferably, the conductivity of $Nb_2O_{5-z}$ is improved by 10,000× by ten thousand times compared with that of $Nb_2O_5$ (see FIG. 5A).

Preferably, the porous metal oxide-based electrochemical energy storage material can realize capacitive energy storage through dangling bonds on the pore walls of the porous structure and a surface defect structure, and the capacitive capacity can reach more than 80%.

Preferably, the actual capacity of the porous metal oxide-based electrochemical energy storage material can break through the theoretical capacity of the traditional material, preferably, the capacity of $Nb_2O_{5-z}$ at 0.5° C. can reach 253 mA h g$^{-1}$, the capacity of iron oxide @$Nb_2O_{5-z}$ can reach 347 mA h g$^{-1}$ at 0.5° C., while the theoretical capacity of $Nb_2O_5$ is 200 mA h$^{-1}$.

Preferably, the porous metal oxide-based electrochemical energy storage material has excellent rate performance, preferably, the capacity of $Nb_2O_{5-z}$ at 100° C. can reach 130 mA h g$^{-1}$, and the capacity of iron oxide @$Nb_2O_{5-z}$ can reach 248 mA h g$^{-1}$ at 100° C.

On the other hand, the present invention also provides a preparation method of the above-mentioned multi-metal composite oxide material, comprising the following steps:

(1) adding a multi-metal composite oxide precursor $B_aM_bO_c$ into an acidic solution containing A ions and mixing to obtain a mixed solution, wherein element B is at least one of alkali metal, alkaline earth metal, lanthanum, and aluminum, $1 \le a \le 2$, $1 \le b \le 8$, $3 \le c \le 17$;

(2) firstly, preserving the temperature of the obtained mixed solution at normal pressure at 50 to 90° C. for 1 hour to 7 days, and then filtering to obtain first particles;

(3) adding the obtained first particles into an acidic solution containing A ions, mixing, then placing the mixture into a reaction kettle, preserving heat at 100 to 140° C. for 1 hour to 7 days, and then filtering to obtain second particles;

(4) adding the obtained second particles into an acidic solution containing A ions, mixing, then placing the mixture into a reaction kettle, preserving heat at 150 to 220° C. for 1 hour to 7 days, and then filtering to obtain an intermediate product;

(5) calcining the obtained intermediate product at 400 to 1,000° C. for 1 to 24 hours in a protective atmosphere to obtain the multi-metal composite oxide material with a defect-rich single crystal structure and a controllable micro mesoporous structure.

In the present disclosure, the multi-metal composite oxide precursor $B_aM_bO_c$ is added to an acidic solution containing A ions and mixed to obtain a first mixed system. Then the first mixed system is placed in a normal pressure environment at 50 to 90° C. for 1 hour to 7 days, so that the acidic solution containing A ions will etch the ions of surface layer and superficial layer of the multi-metal composite oxide, and the ions near the surface layer are slowly dissolved out, and the stability of the structure and the morphology is maintained. Secondly, filtration and addition of an acidic solution containing A ions are performed to obtain a second mixed system. And transferring the second mixed system into a high-temperature and high-pressure reaction vessel, raising the temperature to 100 to 140° C., and maintaining of the heat for 1 hour to 7 days to promote the kinetics of the etching reaction. Finally, filtration and addition of an acidic solution containing A ions are performed to obtain a third mixed system. Raising the reaction temperature of the third mixed system to 150 to 220° C., maintaining of the heat for 1 hour to 7 days to completely dissolve out the N element from the precursor, simultaneously promoting the element A in the solution to be separated out at high temperature, depositing the element A on the surface and in the pores of the oxide in an extremely small size, and promoting the ordering of the crystal structure of the oxide to obtain an intermediate product (solid particles). Finally, placing the obtained solid particles in an inert atmosphere furnace or a vacuum tube furnace for heating and annealing at the annealing temperature of 400 to 1,000° C. for 1 to 24 hours to finally obtain the multi-metal oxide $A_eO_f@M_xO_{y-z}$ with the metal atoms in mixed valence states.

Preferably, the acid in the acidic solution containing A ions is at least one of hydrochloric acid, nitric acid, acetic acid, hydroiodic acid, hydrobromic acid, formic acid, and ethylenediamine tetraacetic acid; the precursor of the A ions is at least one of chloride of the element A, bromide of the element A, iodide of the element A, oxalate of the element A, nitrate of the element A, and sulfate of the element A.

Preferably, in step (1), the molar content of the A ions in the acidic solution containing the A ions is 1 to 100 times, preferably 2 to 10 times, that of the precursor $B_aM_bO_c$ of the multi-metal composite oxide; the molar content of acid in the acidic solution of the A ions is 1 to 50 times, preferably 1 to 3 times that of the precursor $B_aM_bO_c$ of the multi-metal composite oxide; the concentration of the A ions in the acidic solution containing the A ions is 0.1 to 6 mol/L. That is to say, the molar ratio of the precursor BaMbOc of the multi-metal composite oxide to the A ion is 1:(1 to 100), preferably 1:(2 to 10), wherein the molar ratio of the precursor BaMbOc of the multi-metal composite oxide to the acid in the acidic solution containing the A ion is 1:(1 to 50), preferably 1:(1 to 3).

Preferably, in step (3), the molar content of the A ions in the acidic solution containing A ions is 1 to 100 times, preferably 2 to 10 times, that of the precursor $B_aM_bO_c$ of the multi-metal composite oxide. The molar content of the A ions is 1 to 50 times, preferably 1 to 3 times, that of the precursor $B_aM_bO_c$ of the multi-metal composite oxide. The concentration of the A ions in the acidic solution containing A ions is 0.1 to 6 mol/L. Among them, it is preferable that the concentration and the added volume amount of the acidic solution containing A ions in step (3) are the same as those in step (1).

Preferably, the molar content of the A ions in the acidic solution containing A ions is 1 to 100 times, preferably 2 to 10 times, that of the precursor $B_aM_bO_c$ of the multi-metal composite oxide, and the molar content of the acid is 1 to 50 times, preferably 1 to 3 times, that of the multi-metal composite oxide precursor $B_aM_bO_c$, and the concentration of the A ions in the acidic solution containing A ions is 0.1 to 6 mol/L. Among them, it is preferable that the concentration and the added volume amount of the acidic solution containing A ions in step (4) are the same as those in step (1).

Preferably, in step (5), the protective atmosphere is a vacuum atmosphere, an inert atmosphere, or a nitrogen atmosphere; the inert atmosphere is at least one of helium, neon, argon, and nitrogen.

In another aspect, the present invention also provides an application of the foregoing porous metal oxide-based electrochemical energy storage material as an electrode material of an electrochemical energy storage device.

BENEFICIAL EFFECT

In the present invention, the metal oxide-based electrochemical energy storage material has the following beneficial effects: the ordered crystal structure is favorable for improving the stability of the electrochemical process of the material, and reducing a large amount of grain boundary resistance which may be caused by the amount of polycrystal; the defects that the internal size of the crystal is less than 1 nanometer and micropores provide a large number of dangling bonds with high reaction activity, the energy storage capacity of the material is improved, and micropores with the pore diameter of less than 2 nanometers and mesopores with the pore diameter of more than 2 nanometers provide a buffer for the volume change of the material in the electrochemical process, improve the stability of the material, and provide channels for electrolyte diffusion to improve the high-rate working performance of the material; the existence of the mixed valence metal elements in the metal oxide improves the conductivity of the material, so that the electrochemical reaction can be performed more uniformly and smoothly. Therefore, this type of material can be used as an electrode material with high-rate performance and cycling stability, and can meet the requirement of the market for high-performance lithium-ion batteries.

It is further preferred to provide the special composition and microstructure of the multi-metal composite oxide material, and the advantages of the insertion mechanism and the conversion mechanism are combined, so that the reversible lithium storage capacity of the multi-metal composite oxide material is greatly increased, and the multiplying power and the stability of the electrode operation are ensured; thus, this type of material can be used as an electrode material with high lithium storage capacity, high rate performance and cycling stability, and can meet the requirement of the market on high-performance lithium-ion batteries.

BRIEF DESCRIPTION OF THE DRAWINGS

FIG. 5B shows an X-ray photoelectron spectrum of the gray niobium pentoxide Nb$_2$O$_{5-z}$ prepared according to the method of the present invention.

FIG. 6A shows the lithium-ion battery rate performance of niobium pentoxide Nb$_2$O$_{5-z}$ prepared according to the method of the present invention compared to the rate performance of niobium pentoxide Nb$_2$O$_5$ directly synthesized by the sol-gel method shown in FIG. 6B.

DETAILED DESCRIPTION

Figure 1:
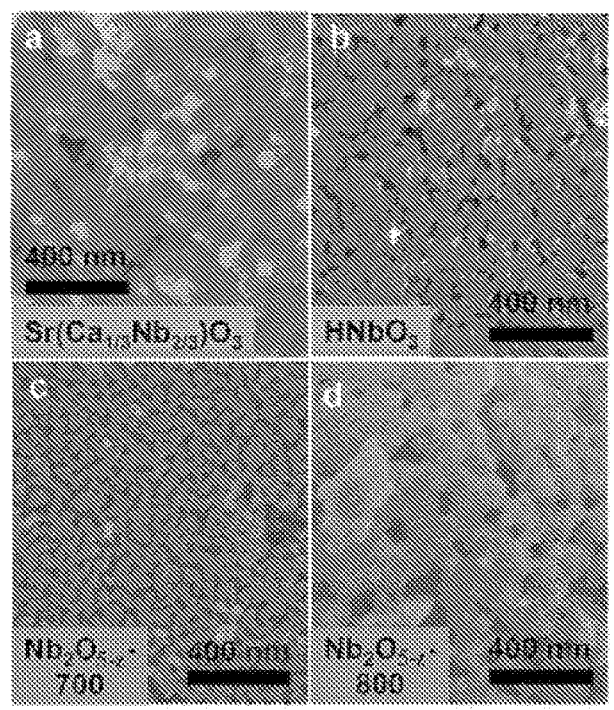
FIG. 1 shows scanning electron micrographs of $HN_bO_3$, $Nb_2O_{5-z}$ annealed at 700° C. and 800° C., and raw material $SrCa_{1/3}Nb_{2/3}O_3$ prepared according to the method of the present invention.

The present invention will be further described below through the following embodiments. It should be understood that the following embodiments are only used to illustrate the present invention, not to limit the present invention.

The present invention aims to provide a metal oxide material with high capacity, high-rate capability and high stability and a preparation method thereof by combining the advantages of two materials, namely high-rate high-stability intercalation type lithium storage and high-capacity conversion type lithium storage, aiming at the current situation of insufficient performance of commercial batteries under high-rate operating conditions.

In the present disclosure, a porous metal oxide-based electrochemical energy storage material with a special microstructure for electrochemical energy storage has a single crystal, quasi-single crystal, or twin crystal structure, and contains metal oxides with mixed valence metal elements, wherein the crystal has defects and porous structure. Its general structural formula is M$_x$O$_{y-z}$, where M is selected from one or the combination of more than two of metal elements such as niobium, molybdenum, titanium, vanadium, manganese, iron, cobalt, nickel, copper, zinc, and the like; and 1≤x≤2, 1≤y≤5, and 0.1≤z≤0.9. It can be used to solve the problem of insufficient performance of electrochemical energy storage anode materials under high-rate working conditions. On the one hand, the existence of mixed valence metal elements and oxygen vacancies greatly increases the electronic conductivity of the material. On the other hand, the existence of a large number of defects and multiple pores improves the ion transmission property and electrochemical activity of the material, more storable lithium sites appear on the surface and superficial layers, and the buffer can be provided for the volume change of the electrode during the working process. The special microstructure provides guarantee for high power density and high stability of the material. The lithium-ion battery using the metal oxide of the present invention as the negative electrode can be used in the fields of electric automobiles and the like that require high power density and high stability.

In the present disclosure, a multi-metal composite oxide material has a special microstructure. The special microstructure is characterized in that a metal oxide ($M_xO_{y-z}$, $1 \le x \le 2$, $1 \le y \le 5$, $0.1 \le z \le 0.9$) with a hierarchical pore structure is used as a matrix (also called a carrier), and other metal oxides ($A_eO_f$, $1 \le e \le 3$, $1 \le f \le 4$) grow in the micropores and mesopores and on the surface of the matrix directly through adsorption and have extremely small sizes under the confinement effect. In other words, the porous metal oxide-based electrochemical energy storage material also comprises a combination of two or more metal oxides, and its structure is that a certain porous single crystal metal oxide is taken as a main structure, and the other metal oxide or metal oxides are limited and deposited in the low-dimensional micro mesopores of the metal oxide of the main structure. Among them, the main body structure metal oxide is main body metal oxides (major metal oxides), and the corresponding metal elements are titanium, niobium, and the like; the non-main structure metal oxide is heterogeneous metal oxide(s), and the corresponding metal elements is at least one of iron, nickel, cobalt, manganese, chromium, zinc, and tin. Preferably, the metal element corresponding to the metal oxide of the main structure is niobium; preferably, the non-main structure metal oxide is iron with respect to the metal element. Among them, the particle size of the matrix is tens of nanometers to tens of microns (for example, 10 nm to 50 μm), and its crystal structure is an ordered single crystal, quasi-single crystal, or twin crystal structure, and its particles have less than five sets of electron diffraction spots, and no obvious electron diffraction rings. In addition, the matrix crystal contains disordered defects and pore structures, and the sizes of the defects and pores are mainly distributed in mesopores with a pore diameter of greater than or equal to 2 nm and less than or equal to 50 nm, and micropores with a pore diameter of less than 2 nm. The particle size of the matrix is basically the same as that of the multi-metal composite oxide material. The obtained multi-metal composite oxide material has a specific surface area of tens to hundreds of square meters per gram, and the specific surface area is as high as 20 to 500 $m^2/g$.

In the present invention, the multi-metal composite oxide material has metal elements in a mixed valent state. Its general structural formula is $AeO_f@M_xO_{y-z}$, wherein, A is selected from a combination of one or two or more of metal elements with conversion or alloy lithium storage mechanisms such as manganese, iron, cobalt, nickel, copper, tin, zinc, etc. Wherein, M is selected from one or a combination of two or more metal elements having an intercalation lithium storage mechanism, such as niobium, molybdenum, titanium, vanadium, tungsten, zirconium, and tantalum. Among them, the atomic ratio of A can be 0.1 to 20 at % (proportion of atoms of A in (A+M)).

In the present invention, by taking the mechanism of the formation of the Caster landform as reference, a method for preparing the metal oxide material is disclosed, and a method for micro-etching alkali (earth) metal and transition metal composite oxide by micro-acid micro-pressing is developed. Specifically, a multi-element metal composite oxide $N_nM_xO_y$ is used as a precursor, an acidic solution in which other metal elements A are dissolved is used as an etching agent, a multi-step method is adopted, all N ions and part of M ions in the precursor are etched and dissolved, a large number of defects and holes are formed while the structural order of the crystal is kept. At the same time, the element A in the acid solution is deposited on the surface of the oxide and in the holes in an in-situ mode in the high temperature reaction environment, and high temperature annealing (calcining) is continued to be assisted after the etching reaction is completed, so that the metal oxide supported by element A oxide and rich in defects and pores, $A_eO_f@M_xO_{y-z}$, is prepared. Moreover, the chemical composition, specific morphology and crystal structure of the obtained product depend on the type and concentration of element A in the acidic solution, the atomic composition and structure of the precursor, and the specific reaction conditions. The preparation method of the material is free from excessive fine regulation and control and a large number of additives, and has the potential and value of industrial mass production.

The following exemplarily illustrates the preparation method of the multi-metal composite oxide material.

Preparation of multi-metal composite oxide precursor $B_aM_bO_c$, B is one or more of alkali metals, alkaline earth metals, lanthanum, aluminum, and other elements, and M is one or a combination of two or more of niobium, titanium, vanadium, tantalum, molybdenum, tungsten, zirconium, and other elements. Among them, $1 \le a \le 2$, $1 \le b \le 8$, and $3 \le c \le 17$. The preparation methods include but are not limited to high-temperature solid phase method, sol-gel method, hydrothermal synthesis method, co-precipitation method, and the like.

The $B_aM_bO_c$ and the acidic solution containing A ions are mixed to obtain a mixed solution. Wherein, A is one or more of metal elements such as manganese, iron, cobalt, nickel, copper, tin, chromium, and zinc. The precursor of the A ion may be one or more of soluble salts such as chloride, bromide, iodide, oxalate, nitrate, sulfate, etc., and is preferably the chloride of A ions. The acid in the acidic solution containing A ions can be one or more of acids such as hydrochloric acid, nitric acid, acetic acid, formic acid, ethylenediaminetetraacetic acid, etc., preferably hydrochloric acid. Among them, the solvent of the acidic solution containing A ions is one or more of solvents such as water, methanol, ethanol, ethylene glycol, propanol, and acetone, preferably water. The acidic solution containing A ions contains the concentration of acid having 1 to 50 times the molar ratio of the precursor and the concentration of A ions having 1 to 100 times the molar ratio of the precursor. In other words, the molar ratio of the multi-metal composite oxide $B_aM_bO_c$ to the A ion may be 1:1 to 1:100, and more preferably 1:10. The molar ratio of the multi-metal composite oxide to the acid is between 1:1 and 1:50, preferably 1:2. Wherein, the concentration of A ions in the acidic solution containing A ions can be 0.1 to 6 mol/L.

The mixed solution adopts a multi-step method to simultaneously carry out the dissolution reaction and the deposition reaction to prepare the multi-metal composite oxide material.

Firstly, the mixed solution is heated to 50 to 90° C. under normal pressure and maintained for 1 hour to 7 days to etch the surface layer and superficial layer ions of the multi-metal composite oxide, and use the acid of the solution to slowly dissolve out B ions near the surface layer, while maintaining the stability of the structure and morphology. After filtration, first particles are obtained, their main phase remains as the precursor, but the crystallinity will decrease. Among them, it is preferable to heat to 80° C. and kept for 2 days.

Secondly, the first particles are added to the acidic solution containing A ions and mixed to obtain a second mixed solution. This is because the concentration of the first mixed solution has decreased after a long time incubation, and changing to a high-concentration original solution will contribute to the progress of the reaction. Wherein, the acidic solution containing A ions has a concentration of 1 to 50 times the molar ratio of the precursor acid, and 1 to 100 times the concentration of the precursor molar ratio of the A ion. The concentration of A ions in the acidic solution containing A ions can be 0.1 to 6 mol/L. The second mixed solution is transferred to a high-temperature and high-pressure reaction vessel, the holding temperature is increased to 100 to 140° C., and the holding time is 1 hour to 7 days to promote the kinetics of the etching reaction. After the reaction is completed, second particles 2 are obtained after filtration. At this time, a small amount of products of the etching reaction have appeared in the second particles, and the precursors and the etching products coexist. Preferably, it is heated to 130° C. and maintained for 3 days.

Thirdly, the second particles are added to the acidic solution containing A ions and mixed to obtain a third mixed solution. The original solution is added again because the acid concentration of the second mixed solution decreases during the long-term heat preservation reaction. Wherein, the acidic solution containing A ions has a concentration of 1 to 50 times the molar ratio of the precursor acid, and 1 to 100 times the concentration of the precursor molar ratio of the A ion. The concentration of A ions in the acidic solution containing A ions can be 0.1 to 6 mol/L. Finally, continuing to increase the reaction temperature of the third mixed solution to 150 to 220° C. and maintaining it for 1 hour to 7 days to further promote the reaction kinetics, dissolved all the B elements, and formed holes on the oxide surface and bulk phase, and the high temperature promotes the element A of the solution precipitates and deposits on the surface of the oxide and inside the pores to obtain solid particles. Preferably, it is heated to 160° C. to 200° C. and maintained for 3 days.

The solid particles are placed in a protective atmosphere such as an inert atmosphere, a nitrogen atmosphere, or a vacuum for high-temperature annealing to obtain a multi-metal composite oxide material. Among them, the inert atmosphere is one or a combination of two or more of He, Ne, and Ar. The annealing temperature is 400 to 1,000° C., and the annealing time is 1 to 24 hours; preferably, the annealing temperature is 600° C., and the annealing time is 8 hours.

In the present invention, the obtained multi-metal composite oxide material with a special microstructure has both the high rate and high stability characteristics of the embedded mechanism electrode material and the high capacity characteristics of the alloy type/conversion mechanism electrode material, which can be used as electrode materials of electrochemical energy storage devices, and can be used to solve the problem of insufficient performance of electrochemical energy storage anode materials under high-rate working conditions. On the one hand, the presence of the mixed valence metal element M and oxygen vacancies greatly increases the electronic conductivity of the material; second, the existence of a large number of defects and pores improves the ion transport and electrochemical activity of the material, and the surface and superficial layers appear more lithium-storage sites, and can also provide a buffer for the electrode volume change during the working process; at the same time, the high-capacity metal oxide material is supported on the high-rate, high-stability metal oxide, combining the advantages of the two types of materials. The special microstructure provides a guarantee for the high power density and high stability of the material.

Sample Characterization

Use scanning electron microscope and transmission electron microscope to collect sample morphology and ultrastructure information, use X-ray diffractometer to collect sample structure information, use specific surface area tester to collect sample pore structure information, and use the comprehensive physical property measurement system to measure samples conductivity, use the blue battery test system to characterize the electrode performance of the sample.

Hereinafter, the present invention will be further described with the following examples. It should be understood that the following examples are used to explain this invention and do not mean to limit the scope of this invention. Any non-essential improvements and modifications made by a person skilled in the art based on this invention all fall into the protection scope of this invention. The specific process parameters below are only exemplary, and a person skilled in the art can choose proper values within an appropriate range according to the description, and are not restricted to the specific values shown below.

Example 1

Adding the $SrCa_{1/3}Nb_{2/3}O_3$ precursor synthesized by the sol-gel method into the hydrochloric acid aqueous solution with the molar ratio of 10 times, keeping the temperature at 80° C. for two days while stirring, filtering the particles, adding the hydrochloric acid aqueous solution with the molar ratio of 10 times again, placing the mixed system into a high temperature and high pressure reaction vessel, reacting at 130° C. for three days, filtering the particles, finally adding the hydrochloric acid aqueous solution with the molar ratio of 10 times, placing the mixed system into a high temperature and high pressure reaction vessel, and reacting at 180° C. for three days to obtain an intermediate product. During the reaction, all strontium ions, calcium ions and part of niobium ions in the raw materials are dissolved out by the hydrochloric acid solution, the hydrogen ions in the hydrochloric acid solution are exchanged into the crystal structure, and after the reaction is finished, the precipitate in the hydrochloric acid solution is separated by filtration under reduced pressure to obtain a white intermediate product, namely niobium acid particles $HNbO_3$. The prepared niobic acid particles are respectively calcined at 700° C. and 800° C. for 4 hours in an argon atmosphere. The gray orthogonal phase niobium pentoxide material $Nb_2O_{5-z}$ is obtained.

Figure 2:
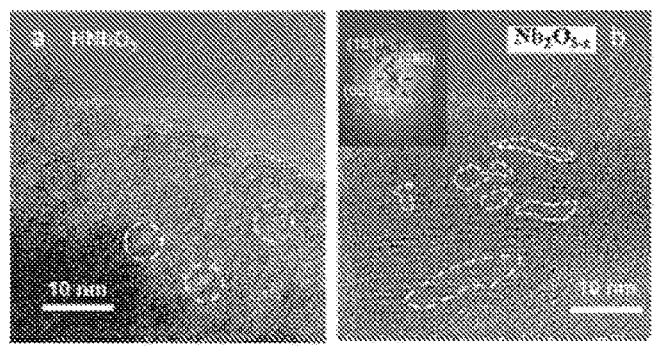
FIG. 2 shows transmission electron micrographs of $HNbO_3$ niobate and $Nb_2O_{5-z}$ niobium pentoxide prepared according to the method of the present invention.
Figure 3:
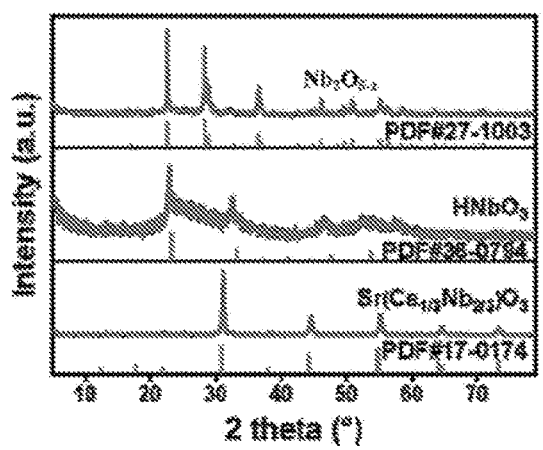
FIG. 3 shows X-ray powder diffraction patterns of niobic acid $HNbO_3$, niobium pentoxide $Nb_2O_{5-z}$ and raw material $SrCa_{1/3}Nb_{2/3}O_3$ prepared according to the method of the present invention.
Figure 4A:
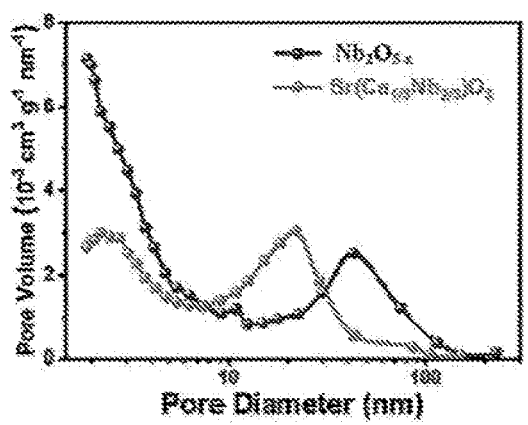
FIG. 4A shows the pore volume distribution of the precursor $SrCa_{1/3}Nb_{2/3}O_3$ and the final product $Nb_2O_{5-z}$ in the size range of 2 to 200 nanometers.
Figure 4B:
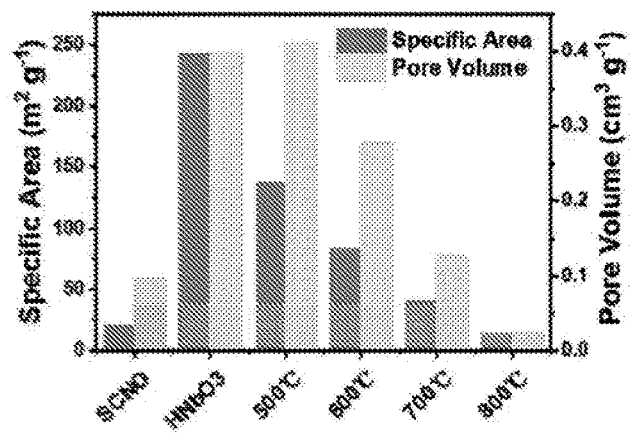
FIG. 4B shows the specific surface area and pore volume of the $HNbO_3$ niobate prepared by the method of the present invention, the $Nb_2O_{5-z}$ obtained by annealing at different temperatures, and the raw material SrCa$_{1/3}$Nb$_{2/3}$O$_3$, the specific surface area and pore volume are calculated from the isothermal adsorption-desorption curve of the samples.
Figure 5A:
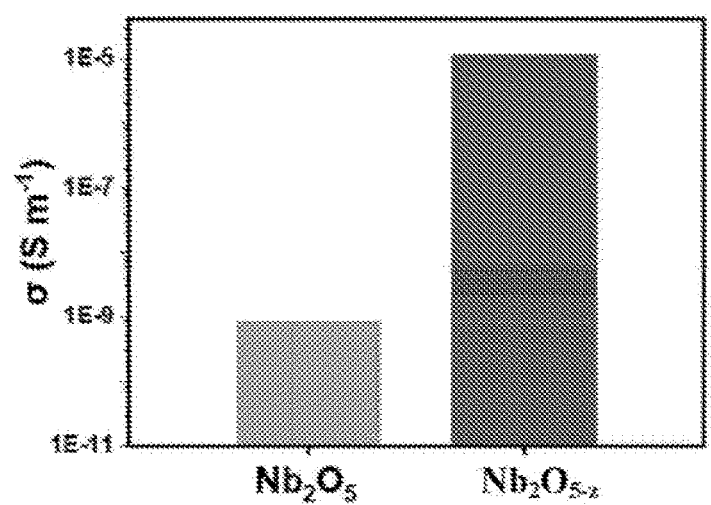
FIG. 5A shows a comparison of the conductivity of a gray niobium pentoxide Nb$_2$O$_{5-z}$ prepared by the method of the present invention and the white niobium pentoxide Nb$_2$O$_5$ prepared directly by the sol-gel method.

It can be seen from FIG. 1 that the particles prepared by the method described in the present invention did not undergo significant changes in size and shape, demonstrating that the reaction proceeds according to the assumption of acid etching, rather than the solution recrystallization process; as shown in FIG. 2, a large number of defects and pore channels exist in the crystal of niobium pentoxide and niobium pentoxide. The particle size of the final product $Nb_2O_{5-z}$ is about 50 nanometers, and the structure is ordered as a single crystal, and a large number of disordered defects and pores exist in the crystal; by comparing the X-ray diffraction pattern in FIG. 3 with the X-ray diffraction (XRD) standard card of the corresponding substance, the precursor $SrCa_{1/3}Nb_{2/3}O_3$, $HNbO_3$ obtained by the etching reaction and the final product orthogonal phase $Nb_2O_{5-z}$ can be seen; it can be seen from FIG. 4A that the pore volume of the final product $Nb_2O_{5-z}$ has a significant increase in the range of 2 to 7 nanometers compared with that of the precursor $SrCa_{1/3}Nb_{2/3}O_3$, indicating that a large number of pores below 7 nanometers are generated in the final product; the maximum specific surface area and pore volume of niobic acid obtained by the etching reaction are the largest can be seen in FIG. 4B, indicating that many pores are generated in the sample particles during the etching reaction. After annealing, the specific surface area and the pore volume are reduced. The higher the annealing temperature is, the larger the reduction is, indicating that the particles are sintered during the annealing process, and the specific surface area and pore volume are reduced. As shown in FIG. 5B, it is found that Nb in the annealed sample $Nb_2O_{5-x}$ exists in $Nb^{4+}/Nb^{5+}$ two valence states through X-ray photoelectron spectroscopy. As shown in FIG. 5A through the conductivity test, it is found that the conductivity of $Nb_2O_{5-z}$ prepared by the method of the present invention is improved by nearly 10,000 times compared with that of $Nb_2O_5$ prepared by the sol-gel method. The improvement of the conductivity is very beneficial for exerting excellent electrochemical energy storage capacity. The performance of the niobium pentoxide prepared by the method described in the present invention is greatly improved and reaches (0.5 C: 253 mA h $g^{-1}$, 25 C: 187 mA h $g^{-1}$, 100 C: 130 mA h $g^{-1}$), and the niobium pentoxide multiplying power performance is outstanding as high-power negative electrode materials for lithium-ion batteries.

Example 2

Adding the $LiNbO_3$ synthesized by the sol method into the salt solution with the molar ratio of 3 times, stirring and keeping the temperature at 80° C. for two days to filter out the particles, adding the salt solution with the molar ratio of 3 times, placing the mixed system into a high-temperature and high-pressure reaction vessel, reacting for three days at 110° C., filtering the particles, finally adding the salt solution with a molar ratio of 3 times, placing the mixed system into a high-temperature and high-pressure reaction vessel and reacting at 150° C. for three days to obtain an intermediate product. During the reaction, all lithium ions and part of niobium ions in the raw materials are dissolved out by the hydrochloric acid solution, and the hydrogen ions in the aqueous solution are exchanged into the crystal structure, and after the reaction is finished, the precipitate in the hydrochloric acid solution is separated by filtration under reduced pressure to obtain a white intermediate product, the niobium particle $HNbO_3$. The prepared niobic acid particles are calcined at 800° C. for 4 hours in an argon atmosphere. The monoclinic phase niobium pentoxide material $Nb_2O_{5-z}$ is obtained.

Example 3

Adding the $SrMoO_4$ synthesized by the sol-gel method into the salt solution with the molar ratio of 3 times, stirring and keeping the temperature at 80° C. for two days to filter out the particles, adding the salt solution with the molar ratio of 3 times, placing the mixed system into a high-temperature and high-pressure reaction vessel and reacting for three days at 110° C., filtering the particles, finally adding the salt solution with a molar ratio of 3 times, placing the mixed system into a high-temperature and high-pressure reaction vessel and reacting at 200° C. for three days to obtain an intermediate product. During the reaction, all strontium ions and part of molybdenum ions in the raw materials are dissolved out by the hydrochloric acid solution, and the hydrogen ions in the aqueous solution are exchanged into the crystal structure, and after the reaction is finished, the precipitate in the hydrochloric acid solution is separated by filtration under reduced pressure to obtain a white intermediate product, the molybdenum oxide particles with amorphous structure. The prepared niobic acid particles are calcined at 600° C. for 4 hours in an argon atmosphere. The molybdenum trioxide material $MoO_{3-z}$ is obtained.

Example 4

Adding the $K_2TiO_3$ synthesized by the high-temperature solid phase method into the hydrochloride with the molar ratio of 5 times, stirring and keeping the temperature at 90° C. for three days to filter out the particles, adding the nitric acid aqueous solution with the molar ratio of 5 times, placing the mixed system into a high-temperature and high-pressure reaction vessel and reacting for three days at 140° C., filtering the particles, finally adding the nitric acid aqueous solution with a molar ratio of 5 times, placing the mixed system into a high-temperature and high-pressure reaction vessel and reacting at 200° C. for three days to obtain an intermediate product. During the reaction, all potassium ions and part of titanium ions in the raw materials are dissolved out by the nitric acid solution, after the reaction is finished, the precipitate in the hydrochloric acid solution is separated by filtration under reduced pressure to obtain a white intermediate product, the amorphous titanium oxide particles. The prepared niobic acid particles are calcined at 600° C. for 4 hours in an argon atmosphere. The titanium dioxide material $TiO_{2-z}$ is obtained.

Example 5

Adding the $LaFeO_3$ synthesized by the high-temperature solid phase method into the formic acid aqueous solution with the molar ratio of 3 times, stirring and keeping the temperature at 80° C. for three days to filter out the particles, adding the formic acid aqueous solution with the molar ratio of 3 times again, placing the mixed system into a high-temperature and high-pressure reaction vessel and reacting for three days at 130° C. to obtain an intermediate product. During the reaction, all lanthanum ions and part of iron ions in the raw materials are dissolved out by the formic acid solution, after the reaction is finished, the precipitate in the hydrochloric acid solution is separated by filtration under reduced pressure to obtain a dark red intermediate product, the iron oxide particles. The prepared particles are calcined at 600° C. for 4 hours in an argon atmosphere. The ferric oxide material $Fe_2O_{3-z}$ is obtained.

Example 6

Adding the $SrTiO_3$ synthesized by the high-temperature solid phase method into the hydrochloric acid ethanol solution with the molar ratio of 3 times, stirring and keeping at 60° C. for three days to filter out the particles, adding the nitrate ethanol solution with the molar ratio of 5 times, placing the mixed system into a high-temperature and high-pressure reaction vessel and reacting for three days at 120° C., filtering the particles, adding the nitrate ethanol solution with the molar ratio of 5 times, placing the mixed system in a high-temperature and high-pressure reaction vessel and reacting at 150° C. for three days to obtain an intermediate product. During the reaction, the strontium ions in the raw materials are dissolved out by the acid solution, and after the reaction is finished, the precipitate therein is separated by filtration under reduced pressure to obtain titanium oxide particles with a rutile phase as the white intermediate product. The prepared particles are calcined in argon at 700° C. for 4 hours. The titanium dioxide material $TiO_{2-z}$ is obtained.

Example 7

Adding the $K_2Ti_8O_{17}$ synthesized by the high-temperature solid phase method into the formic acid aqueous solution with the molar ratio of 5 times, stirring and keeping at 60° C. for three days to filter out the particles, adding the formic acid aqueous solution with the molar ratio of 5 times again, placing the mixed system in a high-temperature and high-pressure reaction vessel and reacting for three days at 130° C. to obtain an intermediate product. During the reaction, the potassium ions in the raw materials are dissolved out by the acid solution, and after the reaction is finished, the precipitate is separated by filtration under reduced pressure to obtain titanium oxide particles with anatase phase as the white intermediate product. The prepared particles are calcined in argon at 500° C. for 4 hours. The titanium dioxide material $TiO_{2-z}$ is obtained.

Example 8

In Example 8, using the orthogonal phase niobium pentoxide material prepared in Example 1 to make a lithium-ion battery, and performing the electrochemical performance test.

Using the niobium pentoxide material prepared in Example 1, acetylene black, and polyvinylidene fluoride to prepare a slurry with a mass ratio of 8:1:1, and coating the slurry on the copper foil and drying, and cutting round shaped electrode sheet, being used as the positive electrode, using the metal lithium sheet as the negative electrode, and using $LiPF_6$ solution with a concentration of 1 mol $L^{-1}$ (the mixed solvent is composed of ethylene carbonate, diethyl carbonate, dimethyl carbonate with a mass ratio of 1:1:1) as electrolyte. Using the Whatman porous polypropylene film as the thin film, and using a CR2016 battery case to assemble a buckle lithium-ion battery.

The buckle lithium-ion battery prepared by using the niobium pentoxide material of Example 1 as the positive electrode is subjected to a rate charge-discharge performance test under the conditions of a charge-discharge voltage range of 1 to 3V and a temperature of 20±5° C., and long-term cycle performance test. The performance test results are shown in FIGS. 6A and 6B.

Its rate performance can be seen: 0.5 C: 253 mA h $g^{-1}$, 25 C: 187 mA h $g^{-1}$, 100 C: 130 mA h $g^{-1}$, excellent capacity retention rate under rapid charge and discharge. At the same time, the long-cycle stability is excellent, and it can maintain 93% of the battery capacity after 4,000 cycles at a high rate of 25 C, which is better than most commercial negative electrode materials.

Example 9

In Example 9, using the monoclinic phase niobium pentoxide material prepared in Example 2 to fabricate a lithium-ion battery, and performing the electrochemical performance test.

Using the titanium dioxide material prepared in Example 7, acetylene black, and polyvinylidene fluoride to prepare slurry with a mass ratio of 8:1:1, and uniformly coating the slurry on the copper foil and drying, and the round electrode sheet is cut and used as the positive electrode, and the metal lithium sheet is used as the negative electrode, and the $LiPF_6$ solution with a concentration of 1 mol $L^{-1}$ (the mixed solvent is composed of ethylene carbonate, diethyl carbonate, dimethyl carbonate with a mass ratio of 1:1:1) is used as electrolyte, Whatman porous polypropylene film is used as thin film, and a CR2016 battery case is used to assemble a buckle lithium-ion battery.

Figure 7:
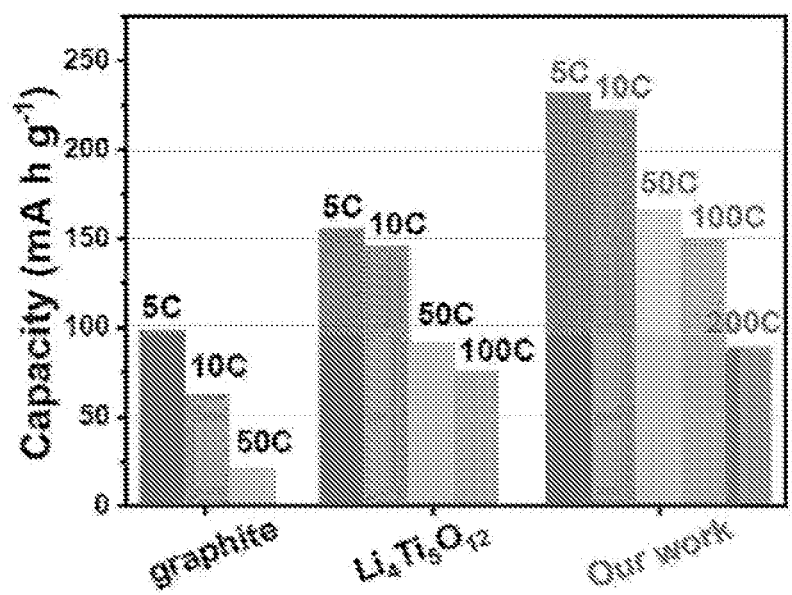
FIG. 7 shows a comparison of the capacity of niobium pentoxide Nb$_2$O$_{5-z}$ prepared according to the method of the present invention versus commercial graphite electrodes and lithium titanate electrodes at different charge and discharge rates.

The specific capacity of the lithium battery is as high as 245 mAh/g, which is far better than the theoretical limit value of 200 mA h $g^{-1}$ of $Nb^{4+}/Nb^{+5}$ and 175 mA h $g^{-1}$ of $Li_4Ti_5O_{12}$. 50 C@4,000 cycles @capacity up to 170 mA h $g^{-1}$, 100 C@152 mA h $g^{-1}$, 150 C@116 mA h $g^{-1}$, 200 C@88 mA h $g^{-1}$, the capacity and rate performance are far superior to $Li_4Ti_5O_{12}$. The performance test results and the performance comparison with common anode materials are shown in FIG. 7.

Example 10

In Example 10, using the titanium dioxide material prepared in Example 7 to fabricate a lithium-ion battery, and performing the electrochemical performance test.

Using the titanium dioxide material prepared in Example 7, acetylene black, and polyvinylidene fluoride to prepare slurry with a mass ratio of 8:1:1, and uniformly coating the slurry on the copper foil and dried, and the circular electrode sheet is cut and used as the positive electrode, the metal lithium sheet is used as the negative electrode, and the $LiPF_6$ solution with a concentration of 1 mol $L^{-1}$ (the mixed solvent was composed of ethylene carbonate, diethyl carbonate and dimethyl carbonate with a mass ratio of 1:1:1) is used as electrolyte, Whatman porous polypropylene film is used as thin film, and a CR2016 battery case is used to assemble a buckle lithium-ion battery.

Figure 8A:
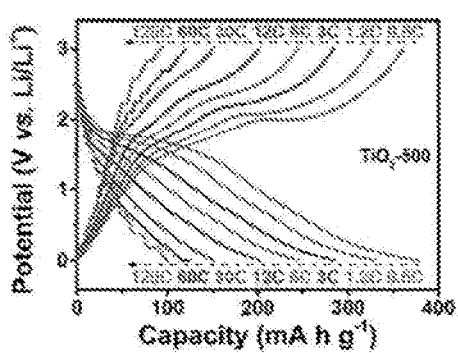
FIG. 8A shows a charge and discharge curve of anatase phase titanium dioxide TiO$_{2-z}$ prepared according to the method of the present invention at different charging and discharging speeds.
Figure 8B:
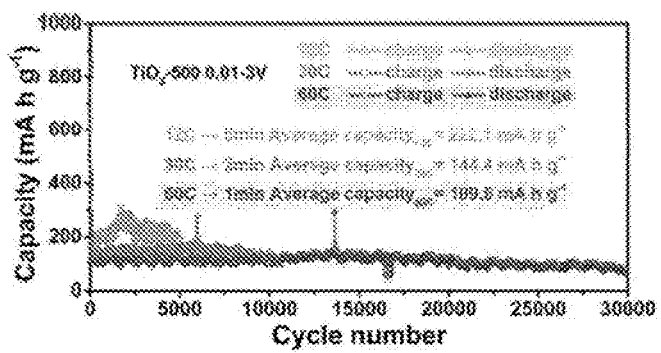
FIG. 8B shows the change in electrode capacity for long-term charge and discharge cycles at different rates.
Figure 9:
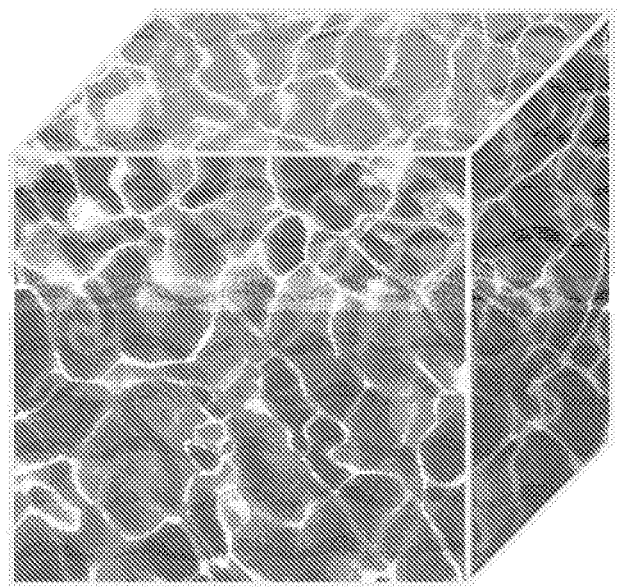
FIG. 9 shows a schematic structural diagram of a metal oxide with a special microstructure prepared according to the method of the present invention. The characteristics of single crystal, quasi-single crystal, twin crystal structure, and porous structure are embodied.

The buckle lithium-ion battery prepared by using the titanium dioxide material of Example 7 as the positive electrode is subjected to rate charge-discharge performance test and long-term cycle performance under the conditions of a charge-discharge voltage range of 0.01 to 3V and a temperature of 20±5° C. The reversible capacity of lithium battery is as high as 355 mA h $g^{-1}$, and it can reach 105 mA h $g^{-1}$ at a charge and discharge rate of 120 C, has excellent cycle stability, can reach 144 mA h $g^{-1}$ for 3,000 cycles at 30 C and 109 mA h $g^{-1}$ for 3,000 cycles at 60 C charge and discharge. The performance test results are shown in FIGS. 8A and 8B.

Example 11

Figure 17:
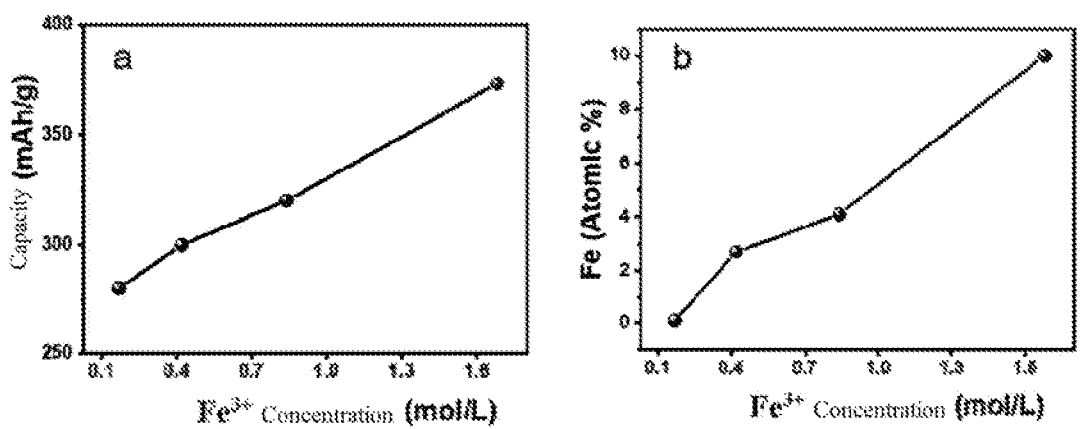
FIG. 17 is a graph of the relationship between the battery capacity of the iron oxide supported niobium pentoxide (iron oxide@Nb$_2$O$_{5-z}$) prepared in Example 11, which is measured by a blue battery test system, and the Fe$^{3+}$ ion concentration added in the preparation reaction (a), and the relationship between the atomic ratio of Fe element and the concentration of Fe$^{3+}$ ions in the preparation reaction (b).
Figure 18:
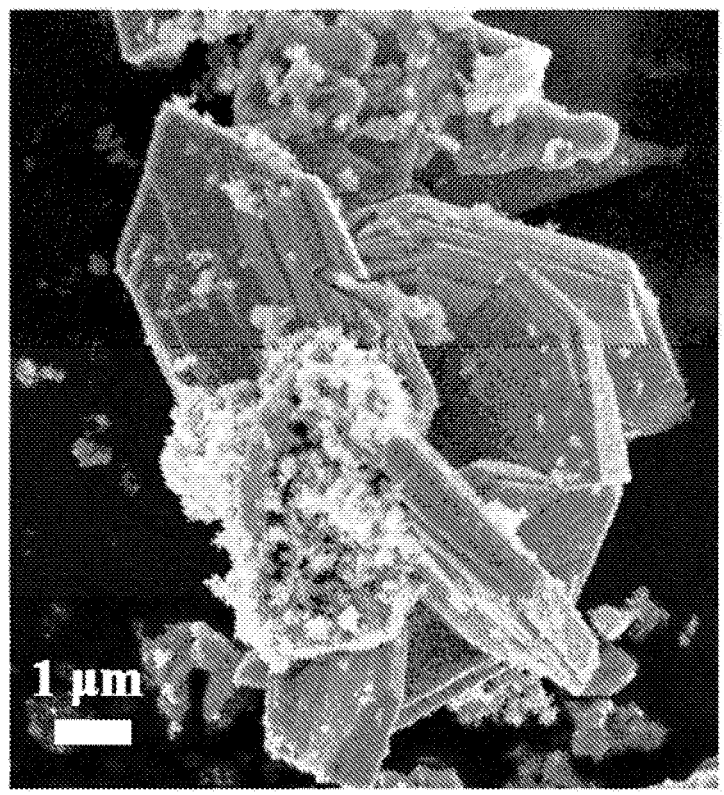
FIG. 18 is a scanning electron micrograph of the intermediate product after the solution reaction in the preparation of Comparative Example 1.

Adding the $LiNbO_3$ precursor synthesized by the sol-gel method into an aqueous solution dissolved in 10 times molar ratio of $FeCl_3$ and 2 times molar ratio of HCl, and stirring the mixture and keeping at 90° C. for two days. Filtering the first particles, and adding the above-mentioned aqueous solution dissolved with 10 times molar ratio of $FeCl_3$ (1.6 mol/L) and 2 times molar ratio of HCl again, and placing the mixed system in a high temperature and high pressure reaction vessel, and reacting at 130° C. for three days. Filtering the second particles, and finally adding the above-mentioned aqueous solution with 10 times the molar ratio of $FeCl_3$ and 2 times the molar ratio of HCl, and placing the mixed system in a high-temperature and high-pressure reaction vessel, and reacting at 160° C. for three days to obtain the intermediate product. In the reaction, all lithium ions and part of niobium ions in the raw materials are dissolved out by the hydrochloric acid solution, the hydrogen ions in the hydrochloric acid solution are exchanged into the crystal structure, the iron ions in the solution are precipitated and deposited on the crystal surface and pores, and after the reaction is finished, the precipitate in the hydrochloric acid solution is separated by filtration under reduced pressure to obtain the yellow intermediate product, the niobic acid particles supported by iron oxide, Fe@HNbO$_3$. The prepared niobic acid particles are calcined at 700° C. for 4 hours in an argon atmosphere to obtain black iron oxide (iron is mainly trivalent, and a small amount of Fe, which accounts for about 1% to 5% of the total Fe atoms, will be reduced to divalent) loaded with monoclinic phase niobium pentoxide material, that is, iron oxide @Nb$_2$O$_{5-z}$, z=0.375. Iron oxide @Nb$_2$O$_{5-z}$ have an atomic ratio of Fe atoms of 10 at %. The specific surface area of the obtained iron oxide @Nb$_2$O$_{5-z}$ is about 61.2 m$_2$/g. Referring to FIG. 17 chart b, when the concentration of FeCl$_3$ is 0.16 mol/L, 0.5 mol/L, 0.8 mol/L, the atomic ratio of Fe in the obtained iron oxide @Nb$_2$O$_{5-z}$ is 0.1 at %, 2.7 at %, 4.1 at %. Moreover, as the concentration of FeCl$_3$ increases, the proportion of Fe atoms gradually increases, and the capacity of the obtained lithium-ion battery gradually increases, refer to chart a in FIG. 17. As for the performance data of the iron oxide @Nb$_2$O$_{5-z}$ obtained in Example 11, unless otherwise specified, it is generally based on the iron oxide @Nb$_2$O$_{5-z}$ product with a Fe atom ratio of 10 at %.

Figure 10:
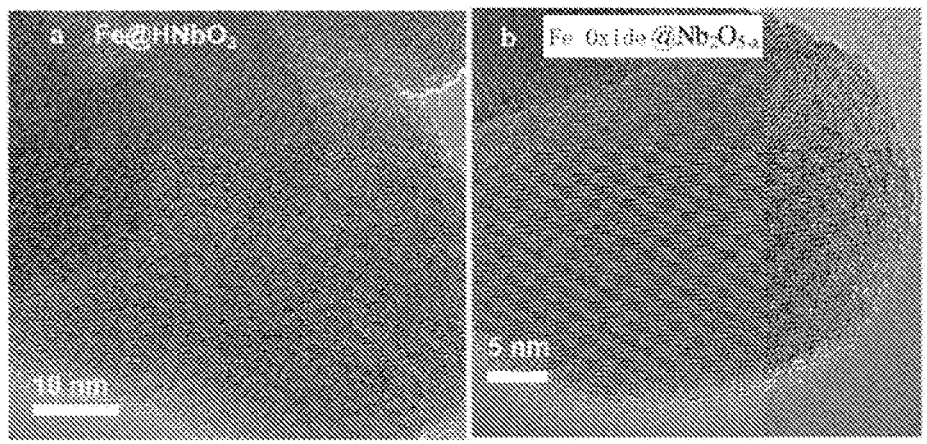
FIG. 10 is a transmission electron micrograph (TEM) of the iron oxide loaded niobate Fe@HNbO$_3$ (a) and iron oxide loaded niobium pentoxide (b) prepared in Example 11.
Figure 11:
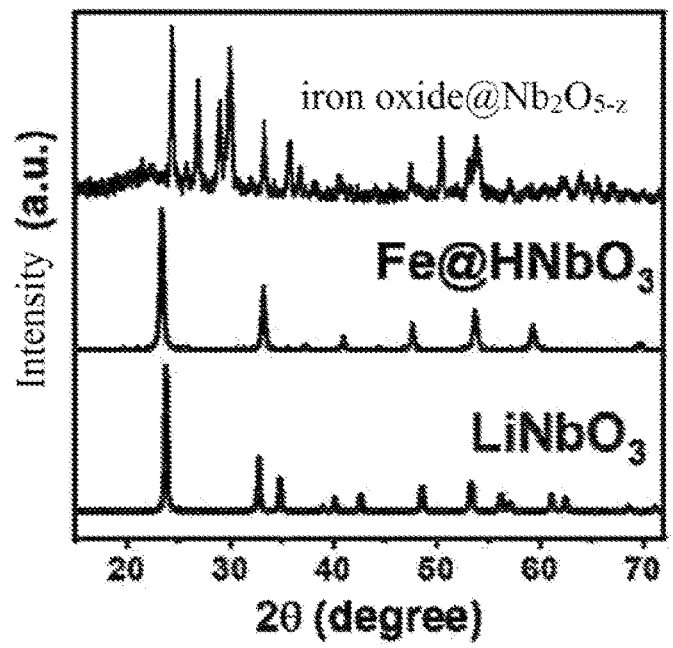
FIG. 11 is an X-ray powder diffraction pattern of the precursor LiNbO$_3$ prepared in Example 11, the intermediate product iron oxide supported Fe@HNbO$_3$ niobate, and the iron oxide supported black niobium pentoxide (iron oxide@Nb$_2$O$_{5-z}$).
Figure 12:
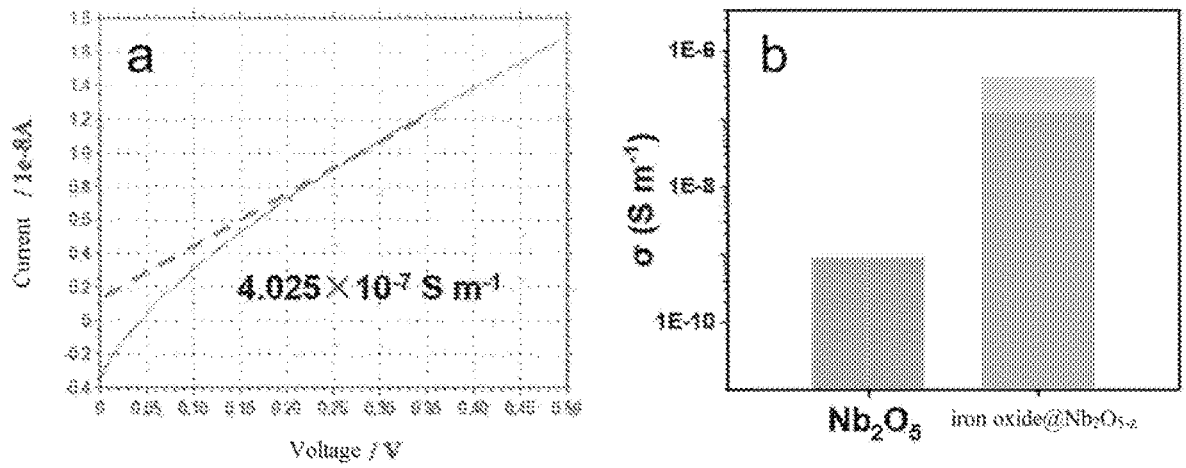
FIG. 12 is a linear scanning voltammetry curve (a) of black niobium pentoxide supported on iron oxide prepared in Example 11 and a comparison (b) of the conductivity of the white niobium pentoxide Nb$_2$O$_5$ and the black niobium pentoxide Nb$_2$O$_5$ supported on iron oxide calculated based on the linear scanning voltammetry.
Figure 20:
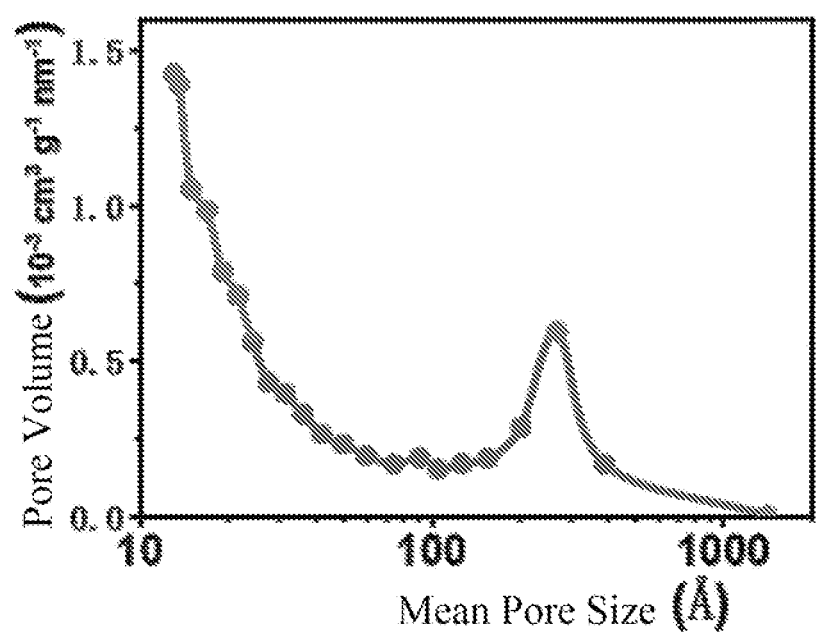
FIG. 20 is a pore size distribution diagram of the iron oxide @Nb$_2$O$_{5-z}$ obtained in Example 11.

It can be seen from FIG. 10 that there are a large number of defects and pores in the Fe@HNbO$_3$ and iron oxide @Nb$_2$O$_{5-z}$ crystals described in the present invention. The final product iron oxide @Nb$_2$O$_{5-z}$ has a particle size of about 50 nanometers and has an ordered structure as single crystal, and there are disordered defects and pores inside the crystal. The pore size distribution analysis is shown in FIG. 20, and it is mostly concentrated below 2 nm and 20 to 30 nm. By comparing the X-ray diffraction pattern in FIG. 11 with the XRD standard card of the corresponding substance, it can be seen that the precursor LiNbO$_3$, the Fe@HNbO$_3$ obtained by the etching reaction and the final product iron oxide @Nb$_2$O$_{5-z}$. Chart a in FIG. 12 shows the linear volt-ampere sweep curve of iron oxide @Nb$_2$O$_{5-z}$, and the conductivity of iron oxide @Nb$_2$O$_{5-z}$ and the comparative sample Nb$_2$O$_5$ are calculated based on this method. The comparison of both conductivity can be seen in chart b in FIG. 12. It is found that the conductivity of the iron oxide @Nb$_2$O$_{5-z}$ prepared by the method of the present invention is hundreds of times 400× higher than that of Nb$_2$O$_5$ prepared by the sol-gel method, and the increase in conductivity is very conducive to the development of excellent electrochemical energy storage capabilities. It can be seen in FIG. 13 that the rate performance of the iron oxide loaded niobium pentoxide prepared by the method described in the present invention is greatly improved, reaching (0.5 C: 347 mA h g$^{-1}$, 25 C: 307 mA h g$^{-1}$, 100 C: 248 mA h g$^{-1}$), to become a leader in high-power anode materials for lithium-ion batteries.

Example 12

Adding the LiNbO$_3$ synthesized by the sol-gel method into an aqueous solution of 5 times the molar ratio of Cr$^{2+}$ and 3 times the molar ratio of hydrochloric acid, and maintaining the temperature at 80° C. for two days while stirring, filtering the first particles, adding an aqueous solution containing 5 times the molar ratio of Cr$^{3+}$ (0.8 mol/L) and 3 times the molar ratio of HCl again, placing the mixed system in a high-temperature and high-pressure reaction vessel and reacting at 110° C. for three days. Filtering the second particles, and finally adding the above-mentioned aqueous solution with 5 times the molar ratio of Cr$^{3+}$ and 3 times the molar ratio of HCl, and placing the mixed system in a high-temperature and high-pressure reaction vessel, and reacting at 150° C. for five days to obtain an intermediate product. During the reaction, all lithium ions and part of niobium ions in the raw materials are dissolved out by the solution, the hydrogen ions in the solution are exchanged into the crystal structure, and the chromium ions in the solution are precipitated and deposited on the oxide particles. After the reaction is finished, it is separated by filtration under reduced pressure to obtain a green intermediate product, namely chromium-loaded niobate particles Cr@HNbO$_3$. The prepared niobic acid particles are calcined at 800° C. for 4 hours in an argon atmosphere to obtain the monoclinic phase niobium pentoxide material loaded by chromium oxide (Cr$_2$O$_3$), namely Cr oxide@Nb$_2$O$_{5-z}$, wherein z=0.45. The atomic ratio of Cr in Cr oxide@Nb$_2$O$_{5-z}$ is 4.8 at %. The specific surface area of the obtained Cr oxide@Nb$_2$O$_{5-z}$ is about 42.5 m$^2$/g.

Example 13

Adding the SrMoO$_4$ synthesized by the sol-gel method into an aqueous solution containing 5 times the molar ratio of Fe$^{3+}$ and 1 times the molar ratio of HCl, stirring at 80° C. and keeping the temperature for two days. Filtering the particles, and adding the above-mentioned 5 times molar ratio Fe$^{3+}$ (0.5 mol/L) and 1 times molar ratio HCl aqueous solution again, placing the mixed system in a high temperature and high pressure reaction vessel, and reacting at 110° C. for three days. Filtering the particles, and finally adding the above-mentioned aqueous solution of 5 times molar ratio Fe$^{3+}$ and 1 times molar ratio HCl, and placing the mixed system in a high temperature and high pressure reaction vessel, and reacting at 200° C. for three days to obtain the intermediate product. During the reaction, all strontium ions and part of molybdenum ions in the raw materials are dissolved out by the hydrochloric acid solution, and the iron ions in the solution are precipitated and deposited on the oxide particles. After the reaction, separating the precipitate by filtration under reduced pressure to obtain a yellow intermediate product with a structure amorphous molybdenum oxide particles. The prepared particles are calcined in a vacuum at 600° C. for 4 hours to obtain Iron oxide (were mainly trivalent Fe, a small amount of about 1 to 5% Fe was reduced to divalent) @MoO$_{3-z}$, and the atomic ratio of Fe in iron oxide @MoO$_{3-z}$ is 7.1 at %. The specific surface area of the obtained iron oxide @MoO$_{3-z}$ is about 48.2 m$^2$/g.

Example 14

Adding the K$_2$TiO$_3$ synthesized by the high-temperature solid phase method into an aqueous solution containing 5 times the molar ratio of Fe$^{3+}$ and 1 times the molar ratio of HNO$_3$, keeping the temperature at 90° C. for three days while stirring, filtering the first particles, adding the above-mentioned aqueous solution containing 5 times the molar ratio of Fe$^{3+}$ (0.7 mol/L) and 1 times the molar ratio of HNO$_3$ again, and placing the mixed system in a high temperature and high pressure reaction vessel and reacting at 140° C. for three days. Filtering the second particles, and finally adding the above-mentioned aqueous solution with 5 times the molar ratio of Fe$^{3+}$ and 1 times the molar ratio of HNO$_3$, and placing the mixed system in a high-temperature and high-pressure reaction vessel, and reacting at 200° C. for three days to obtain the intermediate product. During the reaction, all potassium ions and part of titanium ions in the raw materials are dissolved out by the nitric acid solution, and the iron ions in the solution are precipitated and deposited on the oxide particles. After the reaction, the precipitate is separated by vacuum filtration to obtain a yellow intermediate product as structure amorphous titanium oxide particles. The prepared particles are calcined in a vacuum at 600° C. for 4 hours to obtain Iron oxide (is mainly trivalent Fe, a small amount of about 1 to 5% Fe is reduced to divalent) loaded titanium dioxide material, that is, iron oxide @$TiO_{2-z}$. The atomic ratio of Fe in iron oxide @$TiO_{2-z}$ is 3.2 at %. The specific surface area of the obtained iron oxide @$TiO_{2-z}$ is about 80.5 m$^2$/g.

Example 15

Adding the $SrTiO_3$ synthesized by the high-temperature solid-phase method into an ethanol solution dissolved in 5 times the molar ratio of $CoCl_2$ and 2 times HCl, keeping the temperature at 60° C. for three days, filtering the first particles, adding the above ethanol solution containing 5 times the molar ratio of $CoCl_2$ (0.6 mol/L) and 2 times HCl again, and placing the mixed system in a high temperature and high pressure reaction vessel, and reacting at 120° C. for three days. Filtering the second particles, and finally adding the above-mentioned ethanol solution with 5 times molar ratio of $CoCl_2$ and 2 times HCl, and placing the mixed system in a high temperature and high pressure reaction vessel and reacting at 150° C. for three days to obtain an intermediate product. During the reaction, the strontium ions in the raw material are dissolved out by the solution, and the cobalt ions in the solution are precipitated and deposited on the oxide particles. After the reaction is finished, the precipitate is separated by filtration under reduced pressure to obtain the titanium oxide particles in the rutile phase as the pink intermediate product. The prepared particles are calcined in argon at 700° C. for 4 hours to obtain the titanium dioxide material loaded by cobalt oxide, namely Co oxide@$TiO_{2-z}$, z=0.61. The atomic ratio of Co in Co oxide@$TiO_{2-z}$ is 2.8 at %. The specific surface area of the obtained Co oxide@$TiO_{2-z}$ is about 46.7 m$^2$/g.

Example 16

Adding the $K_2Ti_8O_{17}$ synthesized by the high-temperature solid-phase method into an ethanol solution dissolved in 2 times the molar ratio of $NiCl_2$ and 2 times HCl, keeping the temperature at 60° C. for three days while stirring, filtering the first particles, adding the ethanol solution with 5 times the molar ratio of $NiCl_2$ (0.16 mol/L) and 2 times the HCl, and placing the mixed system in a high temperature and high pressure reaction vessel and reacting at 130° C. for three days, filtering again to obtain second particles. Finally, adding the second particles into the above-mentioned ethanol solution with 5 times the molar ratio of $NiCl_2$ and 2 times the HCl, and placing the mixed system in a high temperature and high pressure reaction vessel, and reacting at 180° C. for three days to obtain the intermediate product. During the reaction, the potassium ions in the raw materials are dissolved out by the solution, and the nickel ions in the solution are precipitated and deposited on the oxide particles. After the reaction, the precipitate is separated by filtration under reduced pressure to obtain a green intermediate product, namely titanium oxide particles with anatase phase. The prepared solid particles are calcined in argon at 500° C. for 4 hours to obtain Ni oxide@$TiO_{2-z}$, z=0.52. Ni oxide (NiO) @$TiO_{2-z}$ contains 4 at % of Ni atoms. The specific surface area of the obtained Ni oxide@$TiO_{2-z}$ is about 80.7 m$^2$/g.

Example 17

In Example 17, using the iron-supported niobium pentoxide material prepared in Example 11 to make a lithium-ion battery, and performing electrochemical performance test.

Using the iron oxide-supported niobium pentoxide material prepared in Example 11, acetylene black and polyvinylidene fluoride to prepare a slurry with a mass ratio of 8:1:1, and uniformly coating the slurry on the copper foil and baked drying, cutting the round electrode sheet, being used as the positive electrode, the metal lithium sheet is used as the negative electrode, and using a $LiPF_6$ solution with a concentration of 1 mol $L^{-1}$ (the solvent was the mixed solvent composed of ethylene carbonate, diethyl carbonate, and dimethyl carbonate with a mass ratio of 1:1:1) as the electrolyte, using the Whatman porous polypropylene film as the thin film, and using the CR2016 battery case to assemble the buckle lithium-ion battery.

Figure 13:
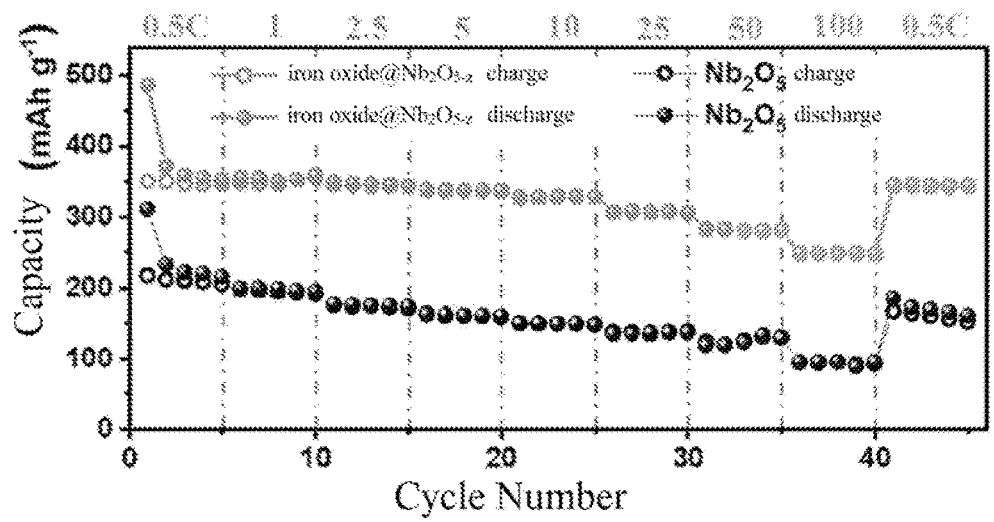
FIG. 13 is a comparison of the rate performance of the iron oxide supported niobium pentoxide lithium-ion battery prepared in Example 11 and the rate performance of the niobium pentoxide Nb$_2$O$_5$ directly synthesized by the sol-gel method.

The buckle lithium-ion battery prepared by using the iron oxide loaded niobium pentoxide material of Example 11 as the positive electrode performed rate charge and discharge performance test under the conditions of a charge-discharge voltage range of 1 to 3V and a temperature of 20±5° C., and long-term cycle performance test. The performance test results and the comparison results with the comparison sample are shown in FIG. 13. It can be seen that its rate performance: 0.5 C: 347 mA h g$^{-1}$, 25 C: 307 mA h g$^{-1}$, 100 C: 248 mA h g$^{-1}$, the capacity retention rate is excellent under fast charge and discharge, and the high-rate performance is better than most negative electrode materials.

Example 18

In Example 18, using the chromium oxide supported niobium pentoxide material prepared in Example 12 to make a lithium-ion battery, and performing the electrochemical performance test.

Using the chromium oxide-loaded niobium pentoxide material prepared in Example 12, acetylene black, and polyvinylidene fluoride to prepare a slurry with a mass ratio of 8:1:1, and uniformly coating the slurry on the copper foil and baked dry, cutting the round electrode sheet and being used as the positive electrode, using the metal lithium sheet as the negative electrode, and using a $LiPF_6$ solution with a concentration of 1 mol $L^{-1}$ (the solvent was the mixed solvent composed of ethylene carbonate, diethyl carbonate, and dimethyl carbonate with a mass ratio of 1:1:1) as the electrolyte, using the Whatman porous polypropylene film as the thin film, and using a CR2016 battery case to assemble a buckle lithium-ion battery.

Figure 14:
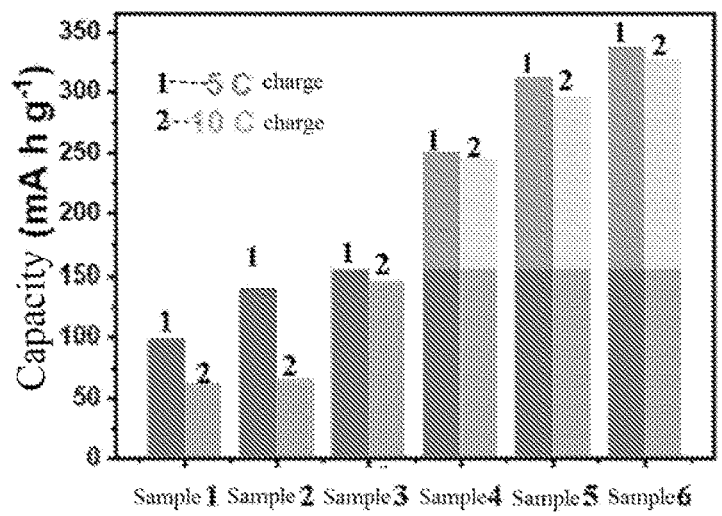
FIG. 14 is a comparison of the iron oxide supported niobium pentoxide (sample 6), chromium oxide supported niobium pentoxide (sample 5), commercial graphite electrode (sample 1), silicon carbon electrode (sample 2), lithium titanate electrode (sample 3) and unloaded black niobium pentoxide Nb$_2$O$_{5-z}$ (sample 4) at different charge and discharge rates prepared in accordance with the present invention.
Figure 15:
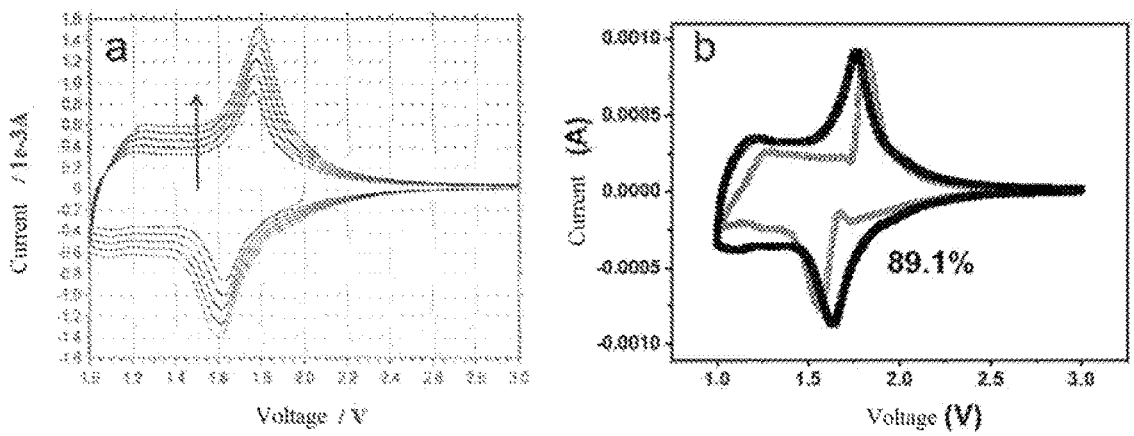
FIG. 15 is a plot of the cyclic voltammetry curve (a) of the iron oxide supported niobium pentoxide prepared in Example 11 at different voltage scanning speeds of 3 to 7 mV s$^{-1}$ and the cyclic voltammetry curve (outer circle curve) (b) of iron-loaded niobium iron oxide@Nb$_2$O$_{5-z}$ at 5 mV s$^{-1}$ scanning speed, and the cyclic voltammetry curve (inner circle curve) with capacitance characteristics obtained by simulation calculation according to (a), integrating the curve shows that the capacitance contribution of iron-loaded niobium pentoxide @Nb$_2$O$_{5-z}$ lithium storage capacity reaches 89.1%, wherein the scanning rate in (a) increases in sequence according to the arrow direction.
Figure 16:
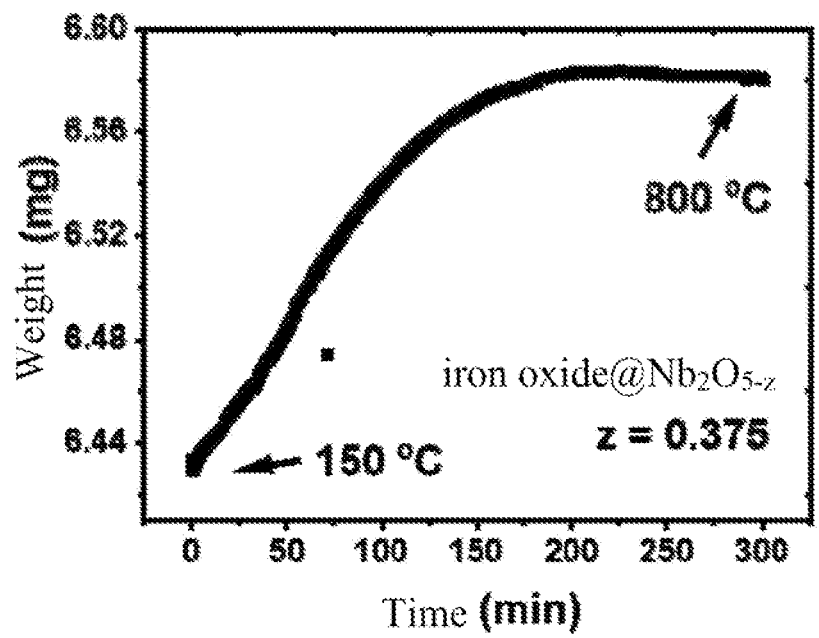
FIG. 16 is the weight change curve of the iron oxide supported niobium pentoxide (iron oxide @Nb$_2$O$_{5-z}$) prepared in Example 11 after being subjected to a full oxidation at 800° C. in air, whose formula z=0.375 can be calculated from FIG. 7 by measuring its increased mass.

The specific capacity of the lithium battery is as high as 331 mAh/g, which is far better than the theoretical limit value of 200 mA h g$^{-1}$ of $Nb^{4+}/Nb^{5+}$ and 175 mA h g$^{-1}$ of $Li_4Ti_5O_{12}$. 208 mA h g$^{-1}$@100 C, 136 mA h g$^{-1}$@250 C, the capacity and rate performance are far better than the unloaded $Nb_2O_{5-z}$ and the common rate-type electrode material $Li_4Ti_5O_{12}$. The rate performance at 5 C and 10 C compares with that of common anode materials as shown in FIG. 14.

Comparative Example 1

Figure 19:
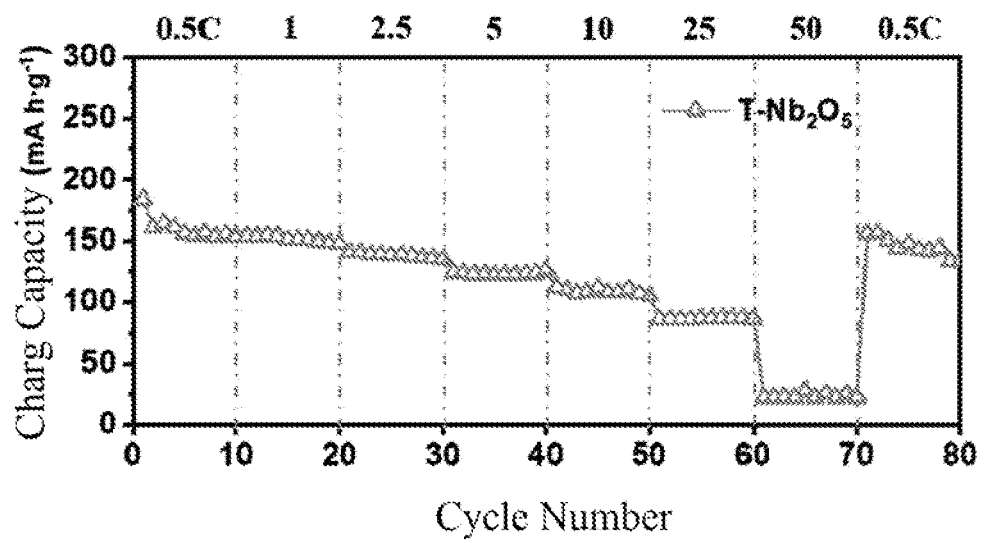
FIG. 19 is a graph of the rate performance of a lithium-ion battery made of the yellow colored iron oxide supported orthogonal phase niobium pentoxide material in Comparative Example 1.

In Comparative Example 1, adding the $LiNbO_3$ precursor synthesized by the sol-gel method into an aqueous solution with 10 times the molar ratio of $FeCl_3$ (1.6 mol/L) and 2 times the molar ratio of HCl, and maintaining the mixture at 90° C. for two days under stirring. Then placing it in a high-temperature and high-pressure reaction vessel, reacting at 130° C. for three days, and then heating to 160° C. for three days to obtain an intermediate product. At this time, the intermediate product did not contain monoclinic phase niobium pentoxide with a porous single crystal structure and a size of about 30 to 50 nm as shown in Example 11, but generated an orthogonal phase with a regular hexagonal morphology. The morphology of niobium pentoxide is shown in FIG. 17. This is due to the special mechanism of the reaction. Specifically, in Example 11, a higher concentration solution was added into the three-step solution reaction at the beginning, and the higher acid concentration ensured that Li ions in the precursor were continuously eluted from the crystal surface to the inside in the three-step reaction to obtain the structure of the porous single crystal. In Comparative Example 1, adding only a high-concentration solution at the beginning of the first solution reaction. The acidity of the solution gradually decreased with the reaction time, which hindered the continuous dissolution of Li in the original precursor, and eventually, the reaction kinetics of Li dissolution in the third step of high temperature reaction was unfavorable, and it became the dissolution-recrystallization process of the precursor, and it became the dissolution-recrystallization process of the precursor. An orthorhombic niobium pentoxide crystal with a great change in morphology and a size increase of more than a hundred times (about 10 μm) was formed, without a porous structure, and iron ions were deposited on its surface. Finally, heating the prepared solid particles at 700° C. for 4 hours in an argon atmosphere to obtain a yellow iron oxide loaded orthogonal phase niobium pentoxide material, namely, iron oxide@$Nb_2O_5$ (non-oxygen-deficient niobium oxide), the specific surface area was only 15.1 $m^2$/g. Since after the reaction of each step was completed, no new acidic solution containing A ion was added, the material obtained was the product of the dissolution-recrystallization process, and it was a niobium pentoxide crystal with no pores and a regular morphology. The iron oxide was simply loaded on the surface instead of in the pores, and the performance was poor, as shown in FIG. 19. The preparation process of the lithium-ion battery in this comparative example 1 refer to Example 17.

The invention claimed is:

1. A method for preparing a porous metal oxide-based electrochemical energy storage material, wherein
   the porous metal oxide-based electrochemical energy storage material comprises a host metal oxide with a hierarchical pore structure,
   the host metal oxide is a single crystal, quasicrystal, or twin crystal structure with ordered atomic lattice arrangement, the host metal oxide contains oxygen atom vacancy defects, and a structural general formula of the host metal oxide is $M_xO_{y-z}$,
   M is selected from the group consisting of niobium element, molybdenum element, titanium element, vanadium element, manganese element, iron element, cobalt element, nickel element, copper element, zinc element, tungsten element, tantalum element, zirconium element, and the combination thereof; and $1 \leq x \leq 2$, $1 \leq y \leq 5$, and $0.1 \leq z \leq 0.9$, and
   the method comprises the following steps:
   (1) preparing a multi-element metal composite oxide $B_aM_bO_c$ as a precursor by solid phase method, sol-gel method, hydrothermal synthesis method, or co-precipitation method; wherein element B is at least one of alkali metal, alkaline earth metal, lanthanum, and aluminum element, $1 \leq a \leq 2$, $1 \leq b \leq 8$, and $3 \leq c \leq 17$;
   (2) mixing the multi-element metal composite oxide $B_aM_bO_c$ obtained in step (1) with an acidic solution, and using a multi-step method to perform an etching reaction to remove element B to obtain a solid; and
   (3) heating and annealing the solid obtained in step (2) at a temperature ranging from 400 to 1,000° C. in an inert atmosphere or in a vacuum to obtain the porous metal oxide-based electrochemical energy storage material.

2. A method for preparing a porous metal oxide-based electrochemical energy storage material, wherein
   the porous metal oxide-based electrochemical energy storage material comprises a host metal oxide with a hierarchical pore structure,
   the host metal oxide is a single crystal, quasicrystal, or twin crystal structure with ordered atomic lattice arrangement, the host metal oxide contains oxygen atom vacancy defects, and a structural general formula of the host metal oxide is $M_xO_{y-z}$,
   M is selected from the group consisting of niobium element, molybdenum element, titanium element, vanadium element, manganese element, iron element, cobalt element, nickel element, copper element, zinc element, tungsten element, tantalum element, zirconium element, and the combination thereof; and $1 \leq x \leq 2$, $1 \leq y \leq 5$, and $0.1 \leq z \leq 0.9$,
   the porous metal oxide-based electrochemical energy storage material further comprises a heterogeneous metal oxide $A_eO_f$ which is deposited confined in the hierarchical pore structure and on a surface of the host metal oxide, and
   A is selected from at least one element of iron element, nickel element, cobalt element, manganese element, chromium element, zinc element, and tin element, $1 \leq e \leq 3$, $1 \leq f \leq 4$, and
   the method comprises the following steps:
   (1) preparing a precursor of multi-element metal composite oxide $B_aM_bO_c$ as a precursor by high temperature solid phase method, sol-gel method, hydrothermal synthesis method, or co-precipitation method;
   (2) adding the obtained multi-element metal composite oxide precursor $B_aM_bO_c$ into an acidic solution containing A ions and mixing them to obtain a mixed solution, wherein element B is at least one of alkali metal, alkaline earth metal, lanthanum, and aluminum, $1 \leq a \leq 2$, $1 \leq b \leq 8$, and $3 \leq c \leq 17$;
   (3) incubating the resulting mixed solution at atmospheric pressure at 50 to 90° C. for 1 hour to 7 days, and then filtering to obtain first particles;
   (4) adding the obtained first particles to an acidic solution containing A ions and mixing them, then placing them in a reaction kettle at 100 to 140° C. for 1 hour to 7 days, and then filtering to obtain second particles;
   (5) adding the obtained second particles into an acidic solution containing A ions and mixing, and then placing in a reaction kettle at 150 to 220° C. for 1 hour to 7 days, and then filtering to obtain an intermediate product; and
   (6) heating the obtained intermediate product in a protective atmosphere at 400 to 1,000° C. for 1 to 24 hours to obtain the porous metal oxide-based electrochemical energy storage material.

* * * * *